United States Patent [19]

Eitan et al.

[11] Patent Number: 5,754,456
[45] Date of Patent: May 19, 1998

[54] COMPUTER SYSTEM PERFORMING AN INVERSE COSINE TRANSFER FUNCTION FOR USE WITH MULTIMEDIA INFORMATION

[75] Inventors: Benny Eitan, Haifa; Baruch Nissenbaum, Ramat-Gan; Meir Feder, Herzliya, all of Israel

[73] Assignee: Intel Corporation, Santa Clara, Calif.

[21] Appl. No.: 610,872

[22] Filed: Mar. 5, 1996

[51] Int. Cl.$^6$ ................................................. G06F 17/14
[52] U.S. Cl. ............................. 364/725.03; 364/725.02
[58] Field of Search ........................... 364/725, 725.03, 364/725.02; 382/250

[56] References Cited

U.S. PATENT DOCUMENTS

| | | | |
|---|---|---|---|
| 5,428,567 | 6/1995 | Horvath et al. | 364/725 |
| 5,483,475 | 1/1996 | Kao | 364/725 |
| 5,590,066 | 12/1996 | Ohki | 364/725 |
| 5,596,517 | 1/1997 | Jones et al. | 364/725 |
| 5,610,849 | 3/1997 | Huang | 364/725 |

OTHER PUBLICATIONS

J. Shipnes, *Graphics Processing with the 88110 RISC Microprocessor*, IEEE (1992), pp. 169–174.
*MC88110 Second Generation RISC Microprocessor User's Manual*, Motorola Inc. (1991).
*MC88110 Programmer's Reference Guide*, Motorola Inc. (1992), pp. 1–5.
*i860™ Microprocessor Family Programmer's Reference Manual*, Intel Corporation (1992), Ch. 1,3,8,12.
R. B. Lee, *Accelerating Multimedia With Enhanced Microprocessors*, IEEE Micro (Apr. 1995), pp. 22–32.
*TMS320C2x User's Guide*, Texas Instruments (1993) pp 3–2 through 3–11; 3–28 through 3–34; 4–1 through 4–22; 4–41; 4–103; 4–119 through 4–120; 4–122; 4–150 through 4–151.
L. Gwennap, *New PA–RISC Processor Decodes MPEG Video*, Microprocessor Report (Jan. 1994), pp. 16, 17.
SPARC Technology Business, *UltraSPARC Multimedia Capabilities On–Chip Support for Real–Time Video and Advanced Graphics*, Sun Microsystems (Sep. 1994).
B. Case, *Philips Hopes to Displace DSPs with VLIW*, Microprocessor Report (Dec. 1994), pp. 12–18.
N. Margulis, *i860 Microprocessor Architecture*, McGraw–Hill, Inc. (1990) Ch. 6, 7, 8, 10, 11.
*Pentium Processor User's Manual, Volume 3: Architecture and Programming Manual*, Intel Corporation (1993), Ch. 1, 3, 4, 6, 8, and 18.

*Primary Examiner*—David H. Malzahn
*Attorney, Agent, or Firm*—Blakely, Sokoloff, Taylor & Zafman

[57] ABSTRACT

A computer system for performing an efficient inverse Discrete Fourier Transform (iDCT) is described. Single Instruction Multiple Data (SIMD) instructions are performed concurrently on a plurality of fixed-point data stored in multimedia registers. Operations on fixed-point data can be performed more quickly than corresponding floating-point operations. Throughout the processing of the iDCT, the fixed-point data are carefully shifted to retain the most significant bits and thereby preserve the accuracy of the multimedia operations. The initial step of transposing the matrix of multimedia data is accomplished while the data is collected to further improve efficiency. Moreover, the step of transposing the matrix of data is broken down into a series of smaller transpositions, depending on the amount of data on which the processor can operate at the same time.

15 Claims, 16 Drawing Sheets

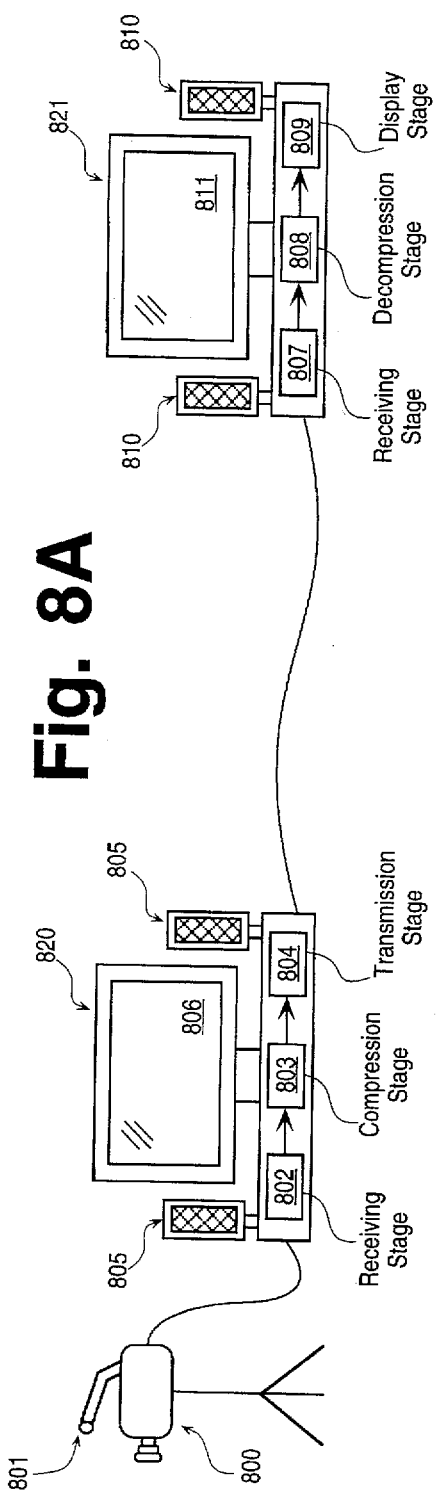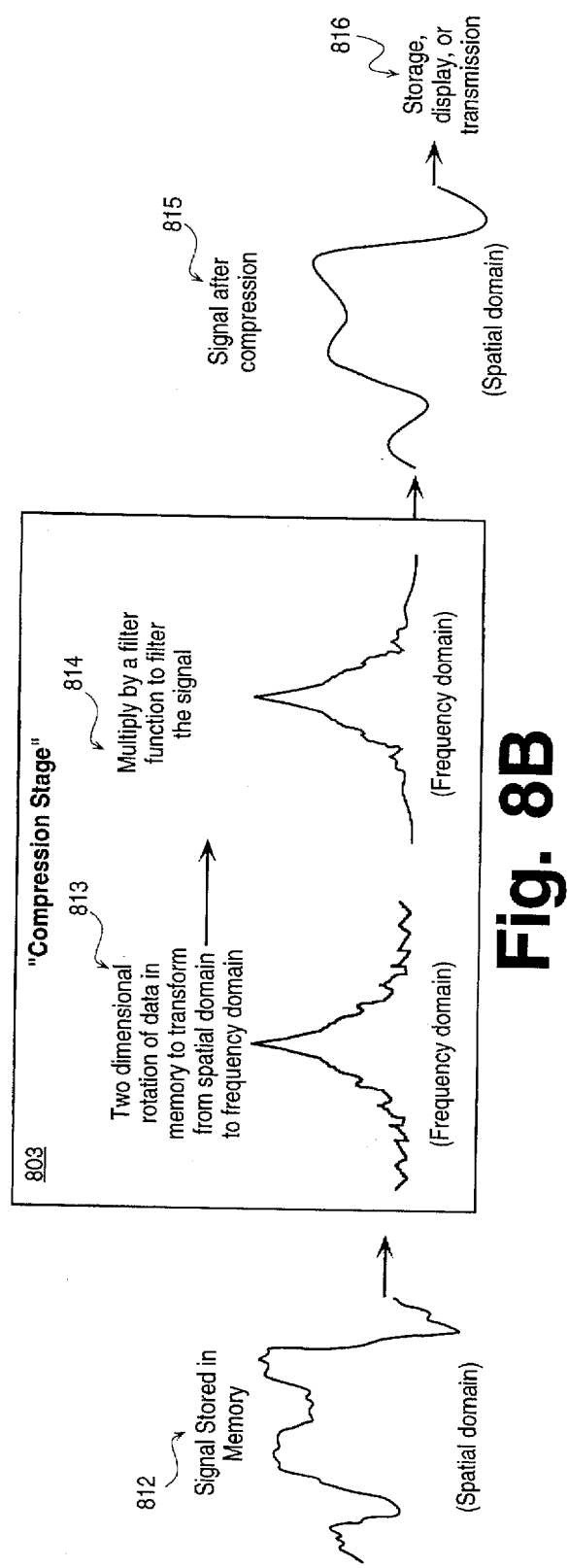

COMPUTER SYSTEM PERFORMING AN INVERSE COSINE TRANSFER FUNCTION FOR USE WITH MULTIMEDIA INFORMATION

CROSS-REFERENCE TO RELATED APPLICATION

Ser. No. 08/611,252, titled "A METHOD FOR PERFORMING AN INVERSE COSINE TRANSFER FUNCTION FOR USE WITH MULTIMEDIA INFORMATION," filed Mar. 5, 1996.

BACKGROUND OF THE INVENTION

1. Field of the Invention

The invention relates to the field of multimedia computers. Specifically, the present invention relates to the performing an inverse Discrete Cosine Transform on multimedia data with a Single-Instruction Multiple-Data (SIMD) computer processor.

2. Description of Related Art

Computer multimedia applications typically involve the processing of high volumes of small data values representing audio signals and video images. Processing the multimedia data often includes performing transform coding which is a method of converting the data values into a series of transform coefficients for more efficient transmission, computation, encoding, compression, or other processing algorithms.

More specifically, the multimedia data values often represent a signal as a function of time. The transform coefficients represent the same signal as a function, for example, of frequency. There are numerous transform algorithms, including the fast Fourier transform (FFT), the discrete cosine transform (DCT), and the Z transform. Corresponding inverse transform algorithms, such as an inverse discrete cosine transform (iDCT), convert transform coefficients to sample data values. Many of these algorithms include multiple mathematical steps that involve decimal numbers.

In most prior art systems, the mathematical steps that involve decimal numbers are performed using a library of floating point mathematical software routines or a floating point coprocessor. Floating point numbers are decimal numbers represented with limited accuracy using a mantissa and an exponent. FIG. 1 illustrates one embodiment of a how a floating point number is typically represented in registers and memory a computer system. The floating point number takes up a fixed size of memory that is split into a mantissa portion 10 and a exponent portion 20. The mantissa 10 represents the most significant digits of the decimal number that is being represented. The exponent portion 20 represents where the decimal point should be placed. Using a binary number floating point representation, the value of the floating point number can be expressed by Value=Mantissa×$2^{Exponent}$.

Performing floating point operations using a library of floating point mathematical software routines that execute on a general purpose processor is time consuming. If the calculations must be performed in real-time, this method is inadequate.

To remedy this problem, many computer processors have a floating point coprocessor. A floating point coprocessor is a processor that is dedicated to performing calculations on floating point values. A floating point coprocessor may reside on a separate integrated circuit that is closely coupled to a main processor integrated circuit or a floating point coprocessor may be an on-chip processor that run is parallel to a central processor core.

However, for applications that require large amounts of mathematical processing in real-time, even a floating point coprocessor may not provide the desired performance. For example, compression and decompression of a video information in real-time requires a very large amount of processing to be performed very quickly to provide a smooth stream of video data. Thus, it would be desirable to have a method for implementing operations that require floating point operations that is significantly faster using a library of floating point mathematical software routines or a floating point coprocessor.

SUMMARY OF THE INVENTION

A method processing multimedia data using an inverse discrete transform is disclosed. The method uses fixed point information instead of floating point information such that it may be processed faster. The fixed point information is processed by a Single Instruction Multiple Data processor that can perform a single mathematical or logical operation on multiple pieces of data at the same time. In between each processing step of the inverse discrete transform, the data in the registers is carefully shifted such that the significant bits of the processing steps can be retained to preserve accuracy.

BRIEF DESCRIPTION OF THE DRAWINGS

The objects, features, and advantages of the present invention will be apparent from the following detailed description of the preferred embodiment of the invention with references to the following drawings.

FIGS. 8a and 8b illustrate an application of the inverse Discrete Cosine Transform in a computer system in accordance with one embodiment of the present invention.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Computer System of the Invention

Figure 1A:
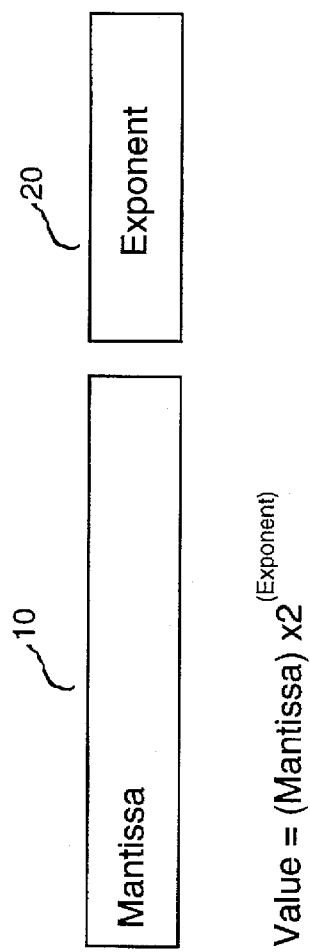
FIG. 1a illustrates a typical representation of a floating point value within a computer system.
Figure 1B:
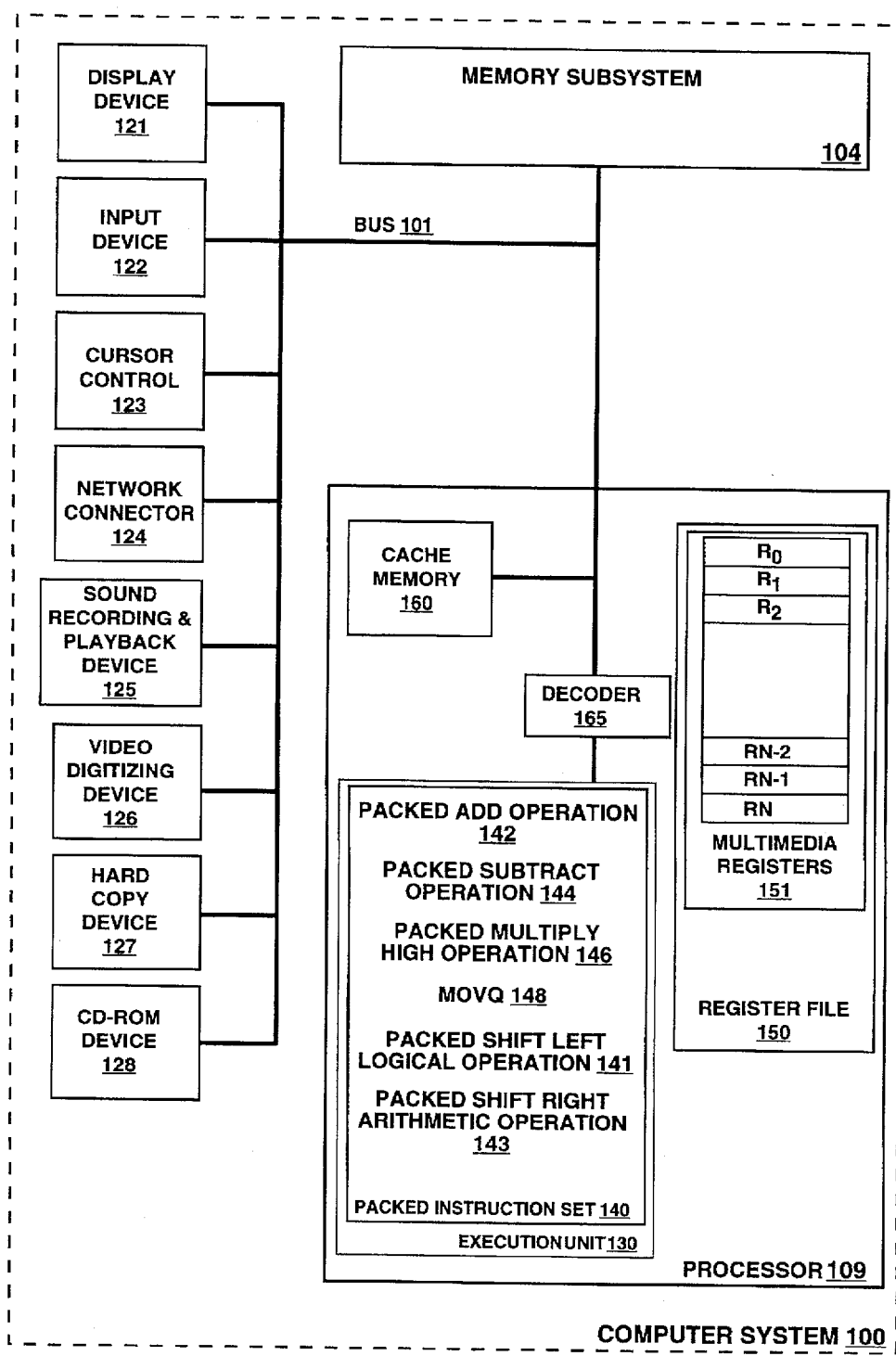
FIG. 1b illustrates a computer system in accordance with one embodiment of the invention.

FIG. 1b illustrates a block diagram of a computer system 100 constructed in accordance with one embodiment of the invention. Computer system 100 comprises a bus 101 for communicating information, processor 109 coupled to bus 101 for processing information, and memory subsystem 104 coupled to bus 101 for storing information and instructions for processor 109.

Processor 109 includes an execution unit 130, a register file 150, a cache memory 160, a decoder 165, and an internal bus 170. Cache memory 160, storing frequently and/or recently used information for processor 109, is coupled to execution unit 130. Register file 150 stores information in processor 109 and is coupled to execution unit 130 via internal bus 170. In one embodiment of the invention, register file 150 includes multimedia registers 151 for storing multimedia information. In one embodiment, multimedia registers 151 each store up to sixty-four bits of packed data. Multimedia registers 151 may be dedicated multimedia registers or registers which are used for storing multimedia information and other information. In one embodiment, multimedia registers 151 store multimedia data when performing multimedia operations and store floating point data when performing floating point operations.

Execution unit 130 operates on packed data according to the instructions received by processor 109 that are included in packed instruction set 140. Execution unit 130 also operates on scalar data according to instructions implemented in general-purpose processors. In one embodiment of the invention, processor 109 supports the Pentium® microprocessor instruction set and the packed instruction set 140. By including packed instruction set 140 into a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may be used in accordance with the described invention. (Pentium® is a registered trademark of Intel Corporation. PowerPC™ is a trademark of IBM, APPLE COMPUTER, and MOTOROLA. Alpha™ is a trademark of Digital Equipment Corporation.)

In one embodiment of the invention, packed instruction set 140 includes instructions for executing a Packed Multiply High 146, a Packed Addition 142, a Packed Subtraction operation 144, a Packed Shift Left Logical operation 141, and a Packed Shift Right Arithmetic operation 143.

By including packed instruction set 140 in the instruction set of general-purpose processor 109 along with associated circuitry to execute the instructions, the operations used by many existing multimedia applications may be performed using packed data in a general-purpose processor. Thus, many multimedia applications may be executed more efficiently by using the full width of a processor's data bus for performing operations on packed data. This eliminates the need to transfer smaller units of data across the processor's data bus to perform one or more operations one data element at a time.

Still referring to FIG. 1, the computer system 100 of the invention includes a display device 121 such as a monitor. The display device 121 may include an intermediate device such as a frame buffer. The computer system 100 includes an input device 122 such as a keyboard, and a cursor control 123 such as a mouse, or trackball, or trackpad. The display device 121, the input device 122, and the cursor control 123 are coupled to bus 101. Computer system 100 may also include a network connector 124 such that computer system 100 is part of a local area network (LAN) or a wide area network (WAN). Additionally, computer system 100 can be coupled to a device for sound recording, and/or playback 125, such as an audio digitizer coupled to a microphone for recording voice input for speech recognition. Computer system 100 may also include a video digitizing device 126 that can be used to capture video images, a hard copy device 127 such as a printer, and a CD-ROM device 128. The devices 124–128 are also coupled to bus 101.

Packed Data Formats of the Invention

Figure 2:
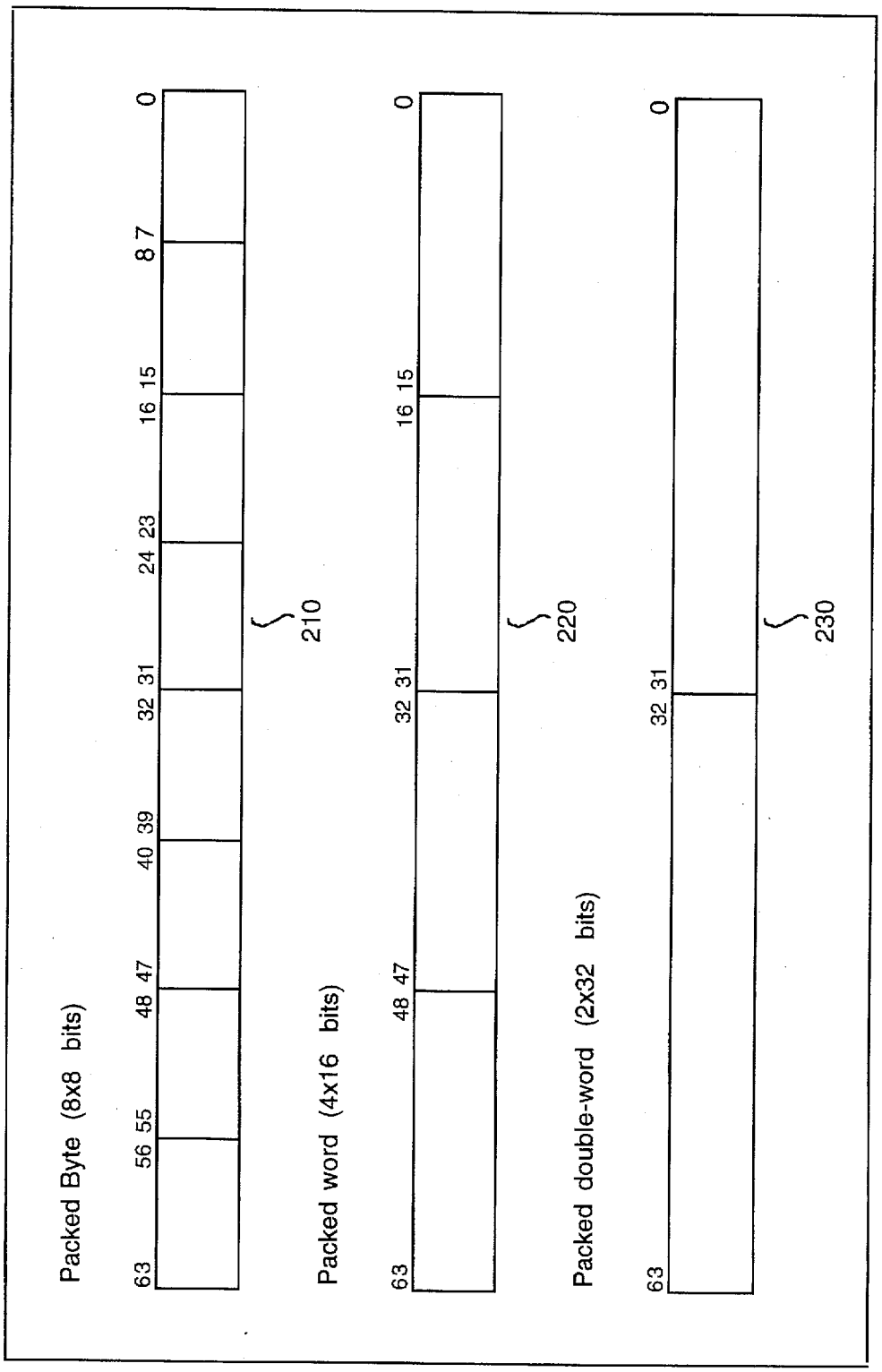
FIG. 2 illustrates a representation of three different formats of packed 64-bit data values.

In one embodiment of the invention, the execution unit 130 operates on data in several different packed data formats. For example, in one embodiment, the computer system 100 manipulates sixty-four-bit data groups. FIG. 2 illustrates three possible packed methods of formatting and interpreting the sixty-four bit data. The packed data formats of FIG. 2 consist of: a packed byte format 210, a packed word format 220, or a packed double-word (dword) format 230. Packed data in a packed byte format 210 includes eight separate 8-bit data elements. Packed data in a packed word format 220 includes four separate 16-bit data elements. Packed data in a packed dword format 230 includes two separate 32-bit data elements. Examples of particular operations are discussed below with reference to packed word format. However, the operations apply similarly to any of the packed data formats of the invention.

Additionally, many of the instructions of packed instruction set 140 can operate on signed or unsigned data and can be performed with or without "saturation". If an operation is performed using saturation, the value of the data element is clamped to a predetermined maximum or minimum value when the result of the operation exceeds the range of the data element. Exceeding the range of the data element is also referred to as data overflow or underflow. The use of saturation avoids the unwanted side effects caused by data overflow or underflow.

Packed Data Instructions of the Invention

Referring now to FIGS. 3a–3f, one embodiment of some instructions from the packed instruction set 140 are described in more detail. In each example described below, the Source 1, Source 2, and Result information are packed data located in multimedia registers 151. Alternate embodiments may access Source 1, Source 2, and/or Result information directly from computer's memory 104. In other embodiments, these registers can be stored in a general purpose register file.

Figure 3A:
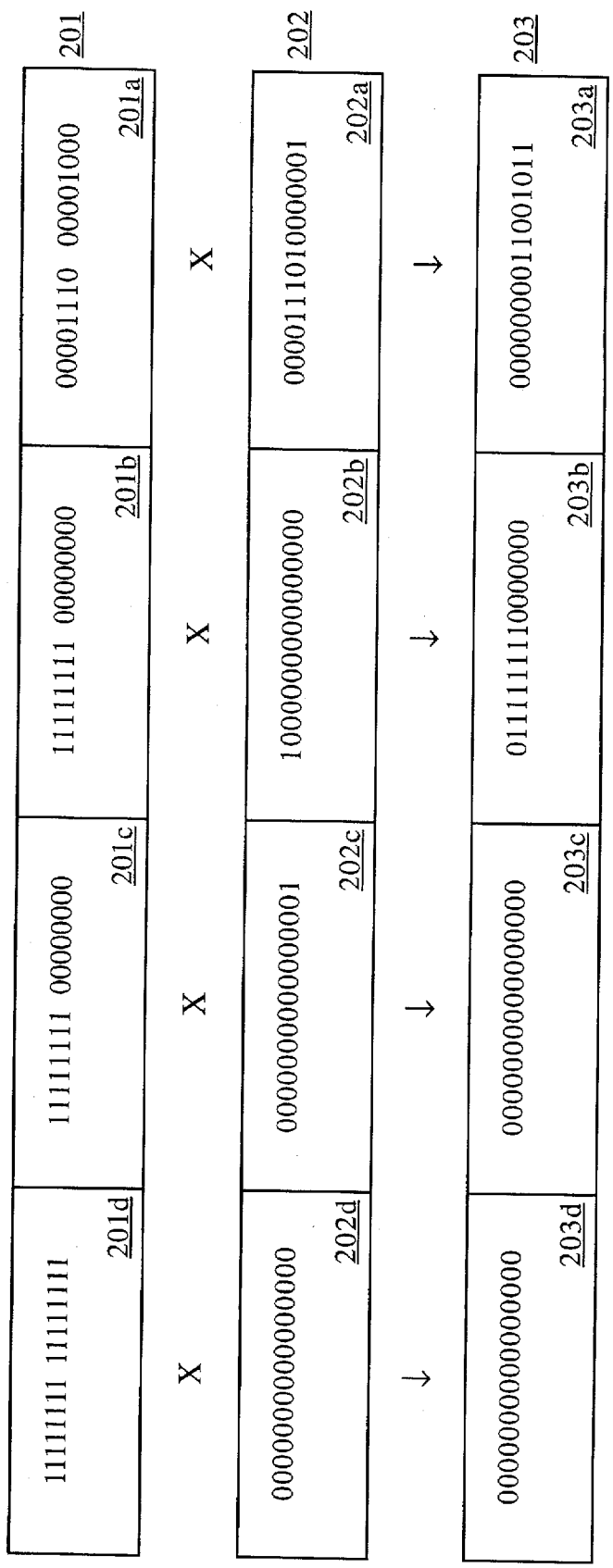
FIG. 3a illustrates the Packed Multiply High operation used in one embodiment in the method of the present invention.

FIG. 3a illustrates an example of the Packed Multiply High (PMULH) operation 146. Data element 203a of Result 203 includes the high order sixteen bits of the product of data element 201a of Source 201 and data element 202a of Source 202. Data element 203b of Result 203 includes the high order sixteen bits of the product of data element 201b of Source 201 and data element 202b of Source 202. Other data elements of Result 203 are computed in a similar manner. The low-order bits of the result are ignored. In alternative embodiments, a packed data memory operand may be used as Source 2 to generate Result 203.

Figure 3B:
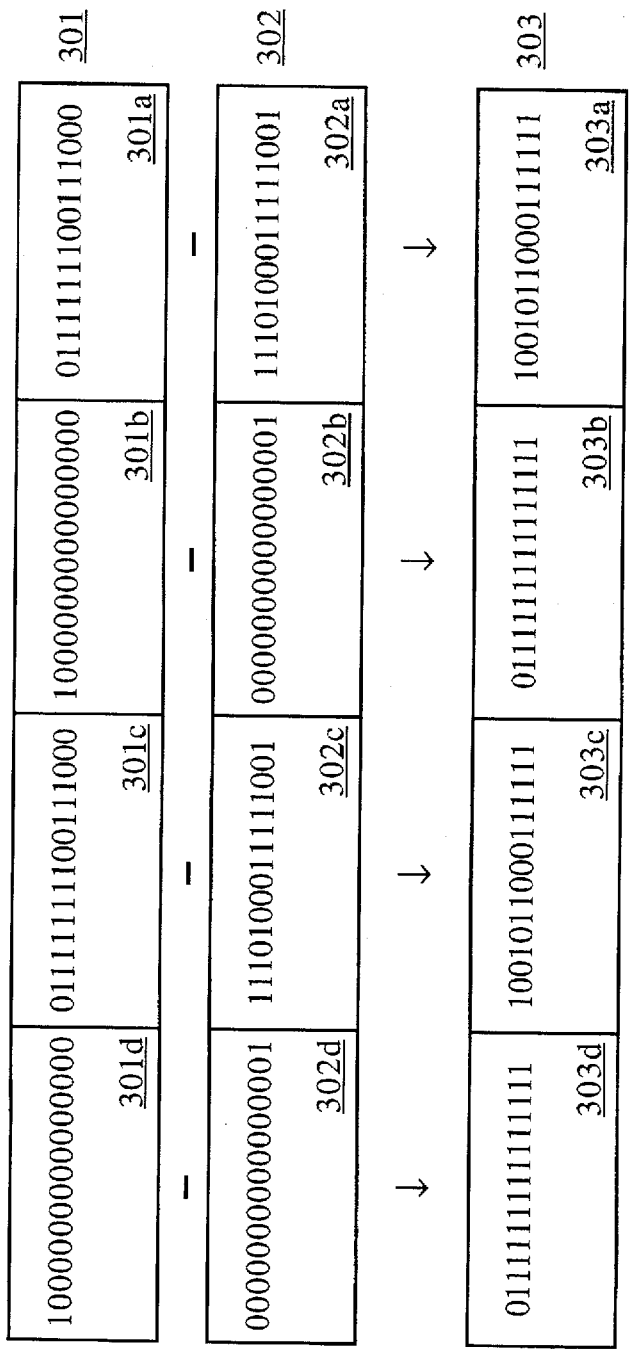
FIG. 3b illustrates the Packed Subtraction operation used in one embodiment in the method of the present invention.

FIG. 3b illustrates an example of the Packed subtraction operation 144. Data element 303a of Result 303 is the difference data element 301a of Source 301 and data element 302a of Source 302. Data element 303b of Result 303 is the difference of data element 301b of Source 301 and data element 302b of Source 302.

Figure 3C:
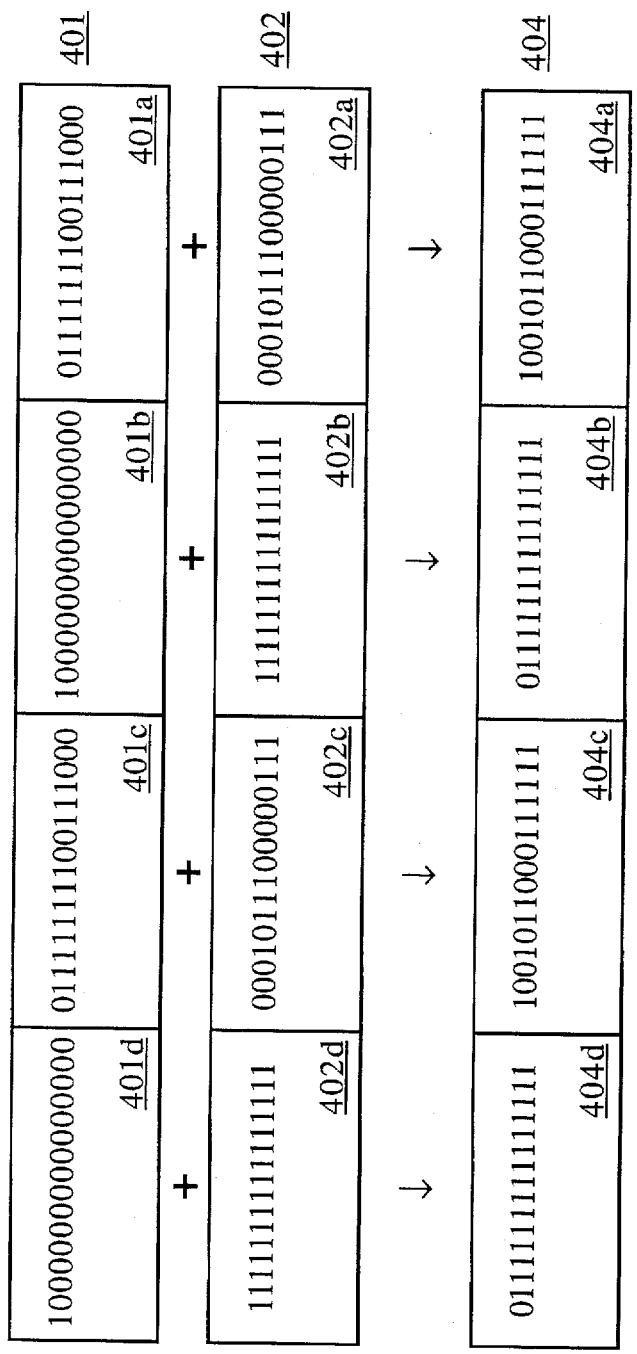
FIG. 3c illustrates the Packed Addition operation used in one embodiment in the method of the present invention.

FIG. 3c illustrates an example of the Packed addition operation 142. Data element 404a of Result 404 is the sum of data element 401a of Source 401 and data element 402a of Source 402. Data element 404b of Result 404 is the sum of data element 401b of Source 401 and data element 402b of Source 402.

Figure 3D:
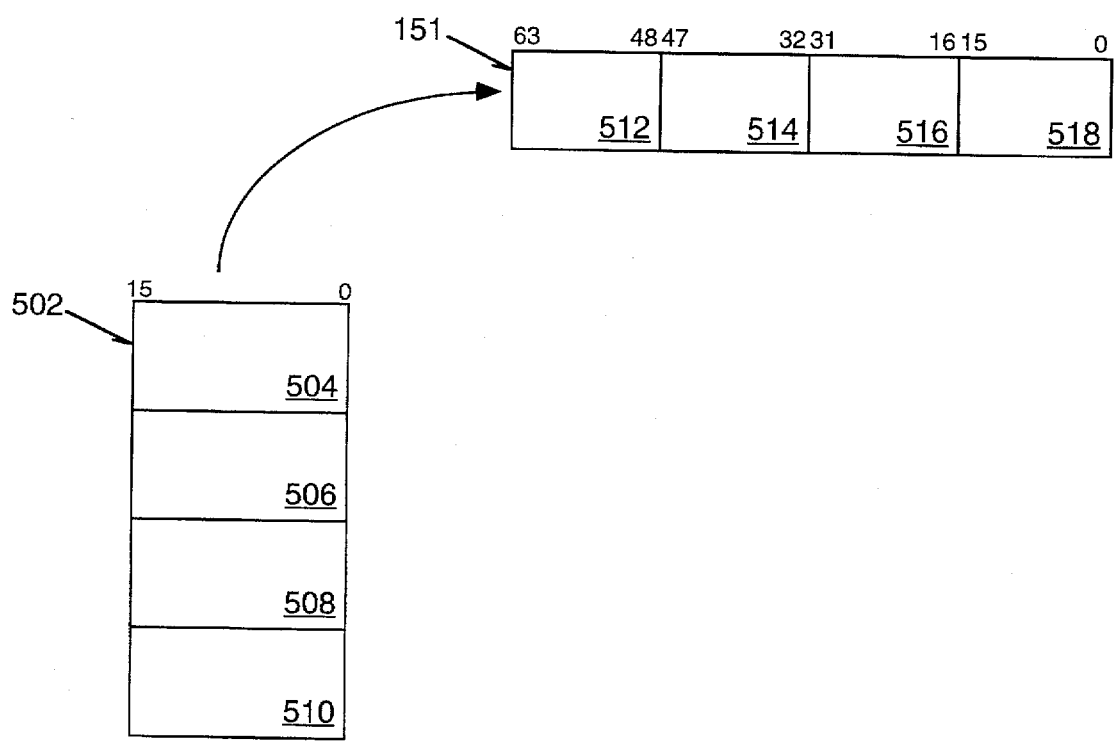
FIG. 3d illustrates the MOVQ operation used in one embodiment in the method of the present invention.

One embodiment of the invention includes a move operation referred to as MOVQ 148, which is used to transfer sixty-four data bits, four packed words, to and from the multimedia registers 151. FIG. 3d illustrates an example of the MOVQ operation. Packed data 502, having packed words 504, 506, 508 and 510 located in memory are transferred to a register of multimedia registers 151, and stored as data elements 512, 514, 516 and 518, respectively.

Figure 3E:
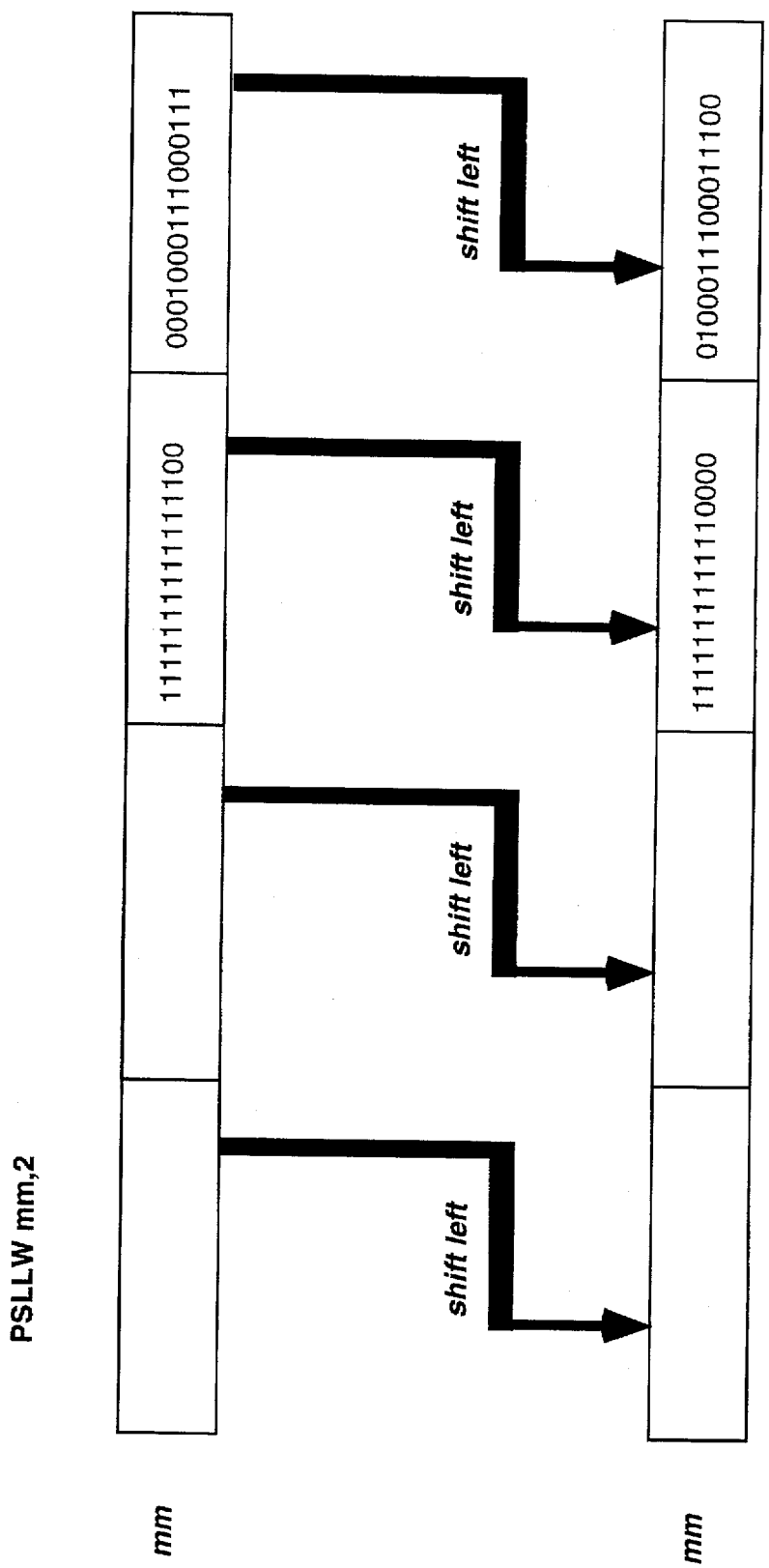
FIG. 3e illustrates a packed shift left logical operation used in one embodiment in the method of the present invention.

FIG. 3e illustrates an example of the Packed Shift Left Logical operation 141. In the Packed Shift Left Logical operation, the data elements of register are each independently shifted to the left by a scalar shift count. The low-order bits of each element are filled with zeroes. The shift count is interpreted as unsigned. Shift counts greater than 15 (for words) 31 (for words) or 63 (otherwise) yield all zeroes.

Figure 3F:
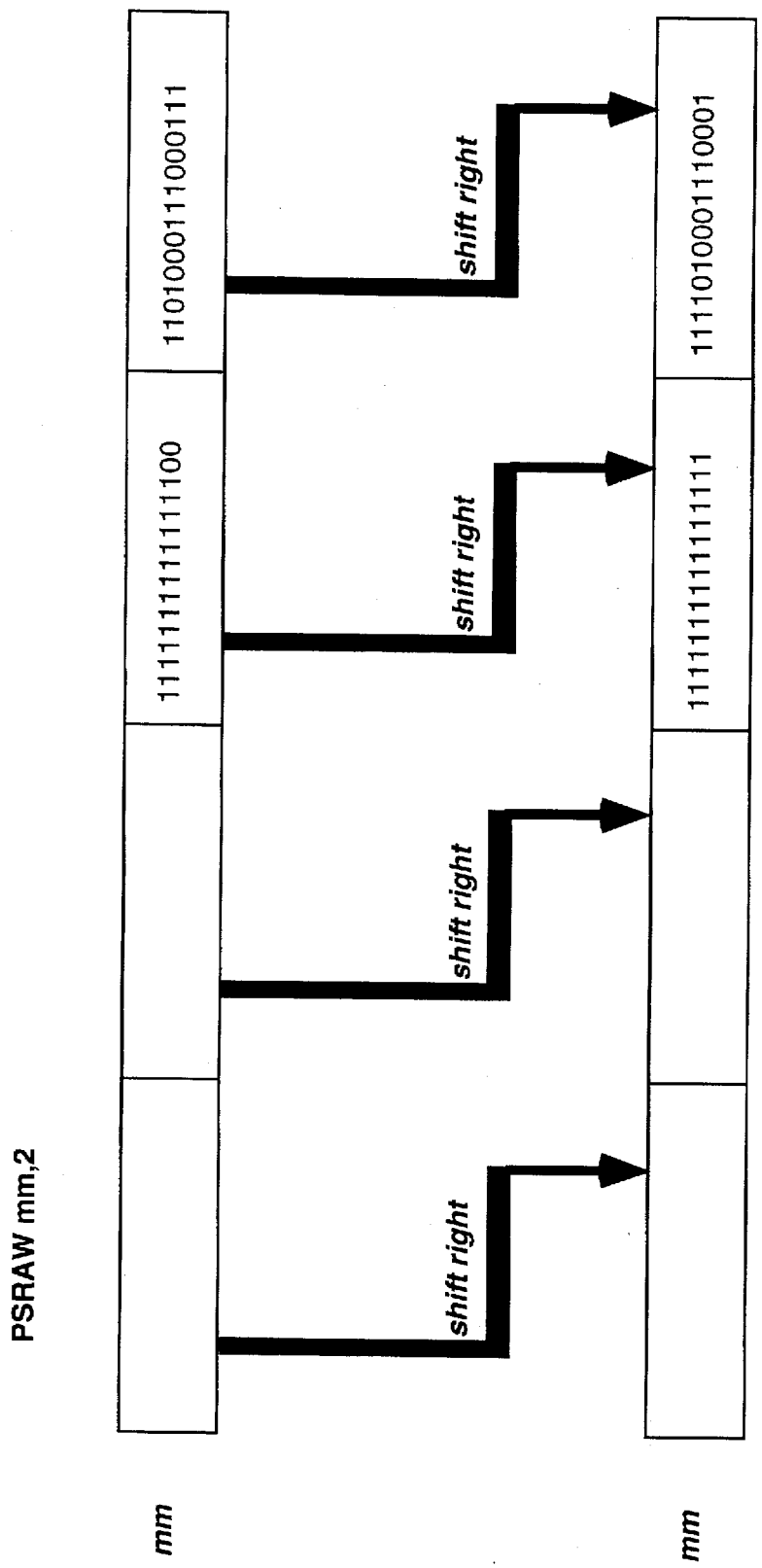
FIG. 3f illustrates a packed shift right arithmetic operation used in one embodiment in the method of the present invention.

FIG. 3f illustrates an example of the Packed Shift Right Arithmetic operation 143. In the Packed Shift Right Arithmetic operation, the signed data elements of source are each independently shifted to the right by a scalar shift count. The high-order bits of each element are filled with the initial value of the sign bits of the data elements in the source. The shift count is interpreted as unsigned. Shift counts greater than 15 (for words) or 31 (for words) yield all ones or zeroes depending on the initial value of the sign bit of the data elements in the source.

INVERSE DISCRETE COSINE TRANSFORMS

As previously mentioned, the invention relates to an efficient method of performing inverse Discrete Cosine Transforms (iDCTs) of data values typically used in multimedia algorithms In particular, the invention involves a unique method of performing an inverse Discrete Cosine Transforms using data values stored in a fixed point packed data format. Normally, floating point values are used when performing an inverse Discrete Cosine Transform such that acceptable accuracy will be achieved. However, the present method implements an inverse Discrete Cosine Transform with fixed point arithmetic in a manner that does not sacrifice accuracy to an unacceptable level. Therefore, the implementation of the present invention generates results faster than previous implementations but with acceptable accuracy.

To efficiently perform an inverse Discrete Cosine Transform (iDCT), the present invention adapted an algorithm published by Yukihiro Arai, Takeshi Agui, and Masayuki Nakajima entitled "A Fast DCT-SQ Scheme for Images". (Hereinafter the Arai-Agui-Nakajima algorithm.) The Arai-Agui-Nakajima algorithm was published in the Transactions of the IEICE, Volume 71, Number 11, page 1095, November 1988.

The Arai-Agui-Nakajima algorithm is a one-dimensional, prescaled DCT/iDCT algorithm. The Arai-Agui-Nakajima algorithm starts with eight input coefficients that are prescaled by eight prescale values. The Arai-Agui-Nakajima algorithm is then applied to the prescaled coefficients in a manner that requires only five multiplications and 29 additions for the transform. One of the most impressive feature of the Arai-Agui-Nakajima algorithm is that it calculates an 8-point DCT with that minimal number of multiply operations. Furthermore, most of the multiply operations can be performed in parallel such that the Arai-Agui-Nakajima algorithm is ideal for a parallel implementation.

Figure 4:
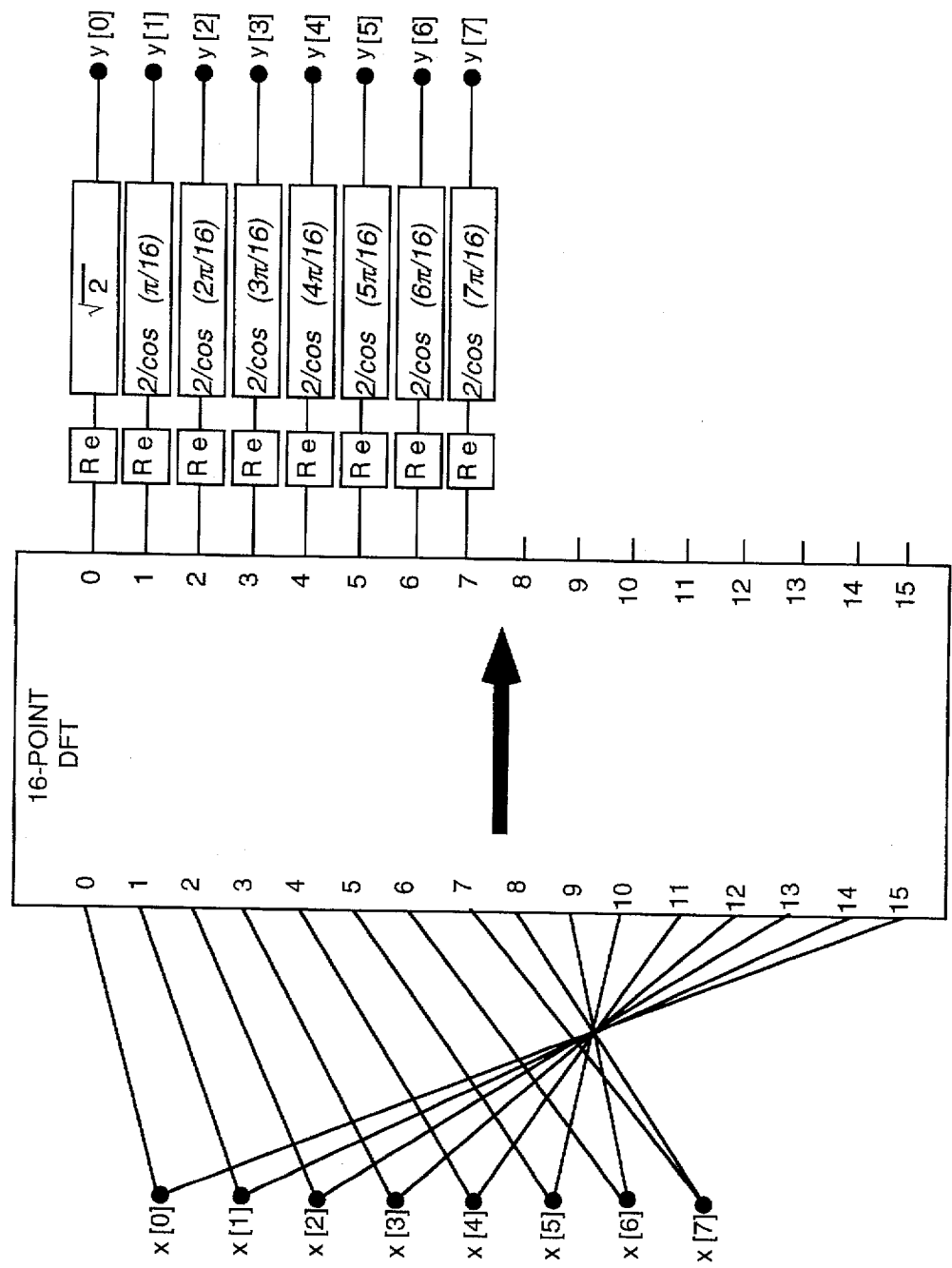
FIG. 4 illustrates a flow diagram of the Arai-Agui-Nakajima Discrete Cosine Transform algorithm.

The Arai-Agui-Nakajima algorithm calculates an 8-point DCT using a 16-point DFT. FIG. 4 illustrates a data flow diagram the explains how the Arai-Agui-Nakajima algorithm calculates an 8-point DCT using a 16-point DFT that only provides the real parts of the coefficients. To perform a quick 16-point DFT that only provides the real parts of the coefficients, the Winograd FFT algorithm was selected. (See S. Winograd, "On Computer the Discrete Fourier Transform", IBM Res. Rep., RC-6291, November 1976).

Figure 5:
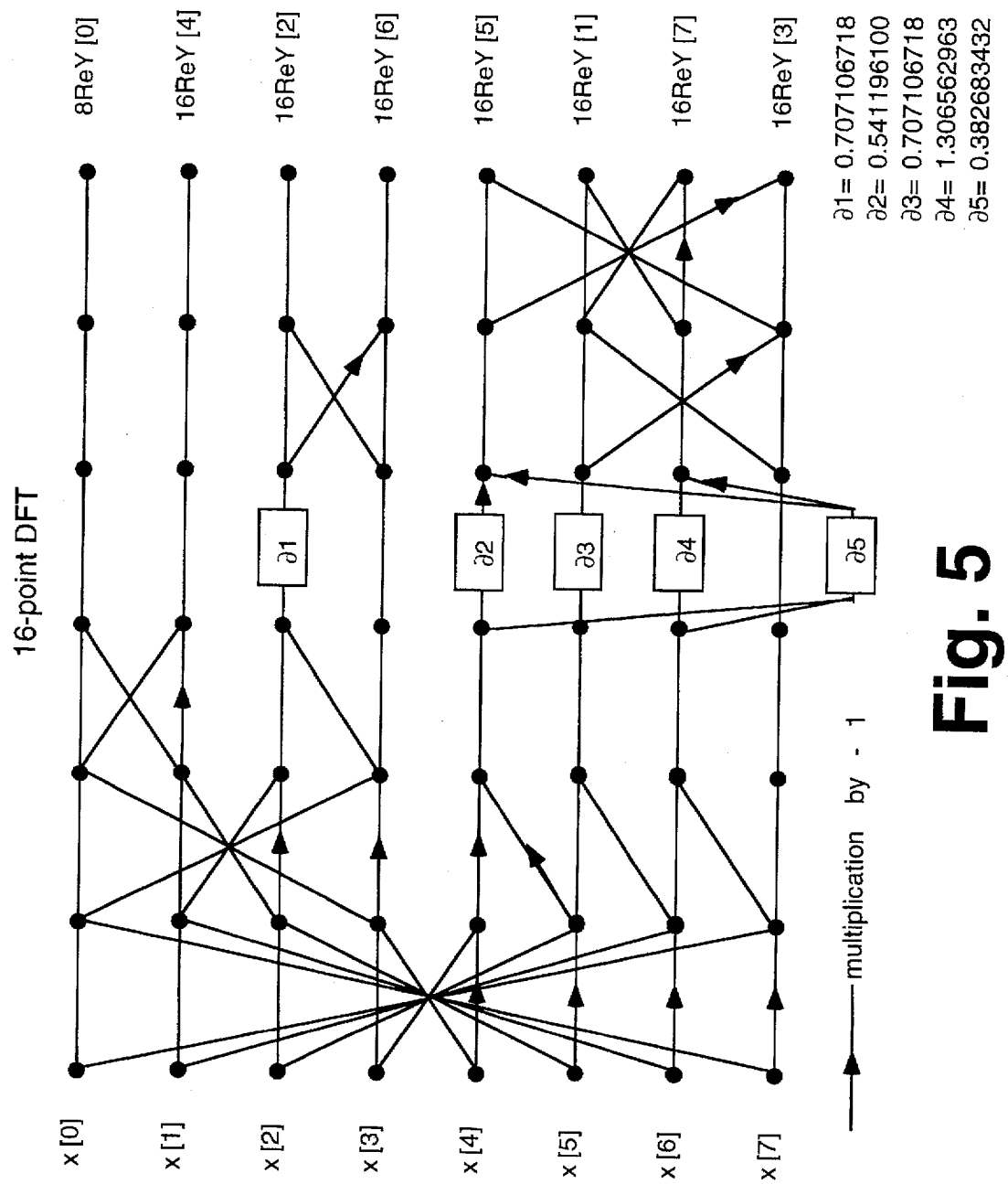
FIG. 5 illustrates a flow diagram of the Winograd Discrete Fourier Transform algorithm.

FIG. 5 illustrates the signal flow that generates the real parts of the coefficients using the Winograd FFT algorithm. As illustrated by the flow diagram of FIG. 5, only five multiply operations are required.

Implementing an efficient inverse Discrete Cosine Transform

The inverse Discrete Cosine Transform is a very important operation for use with multimedia information. Specifically, the inverse DCT is often used for compression and decompression of multimedia information such as audio and video. Ideally, a computer should be able to compress and decompress audio and video information in real-time such that it can be used in applications such as a real-time video-phone.

To accomplish this result, the present invention implements a very fast and efficient version of the inverse Discrete Cosine Transform that exploits the parallelism of the Arai-Agui-Nakajima algorithm. The parallel implementation of the present invention most efficiently uses the features of the computer architecture that can perform four-way SIMD (Single Instruction Multiple Data) instructions.

Figure 6:
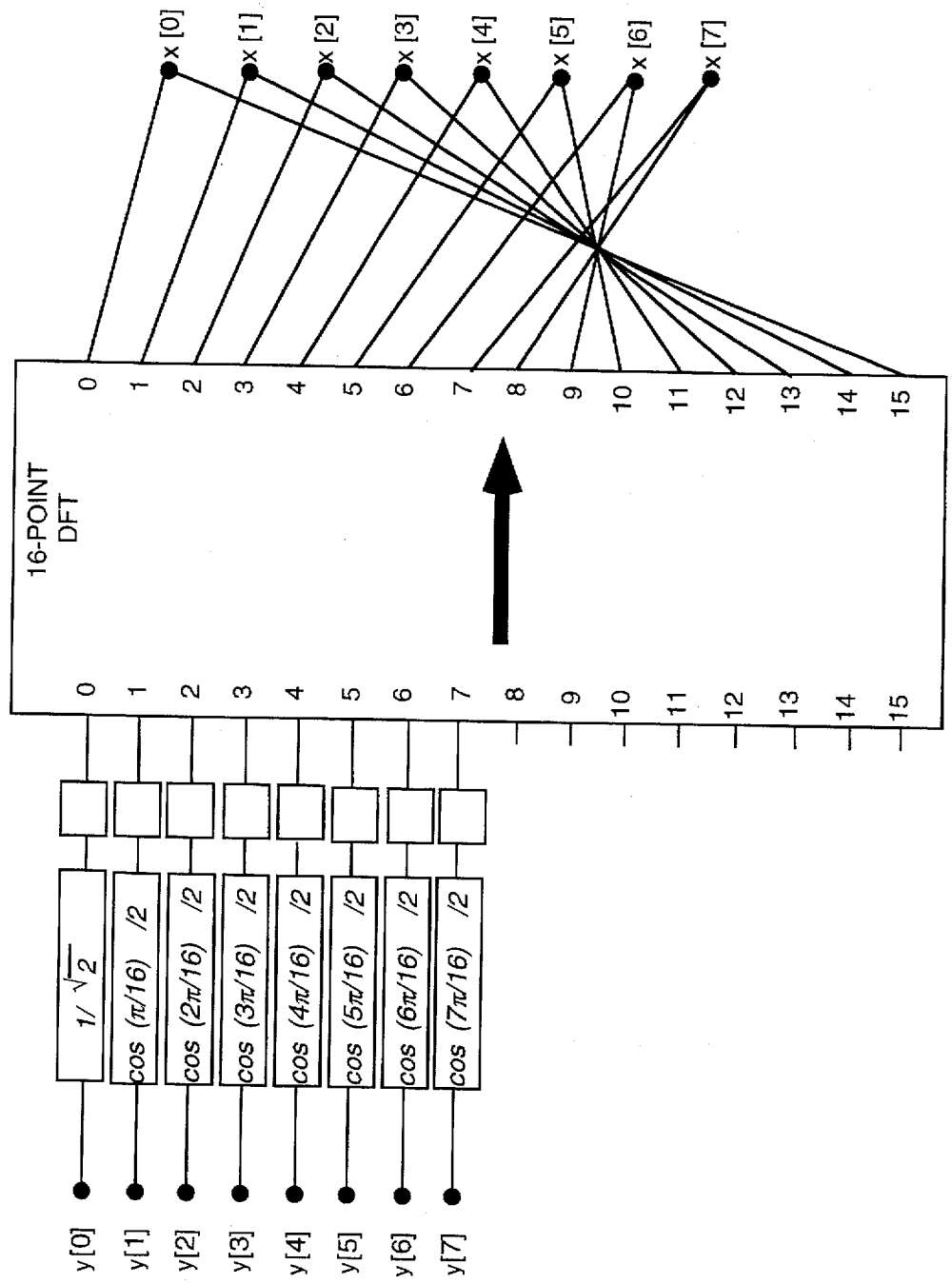
FIG. 6 illustrates a flow diagram of an inverse Discrete Cosine Transform algorithm.
Figure 7A:
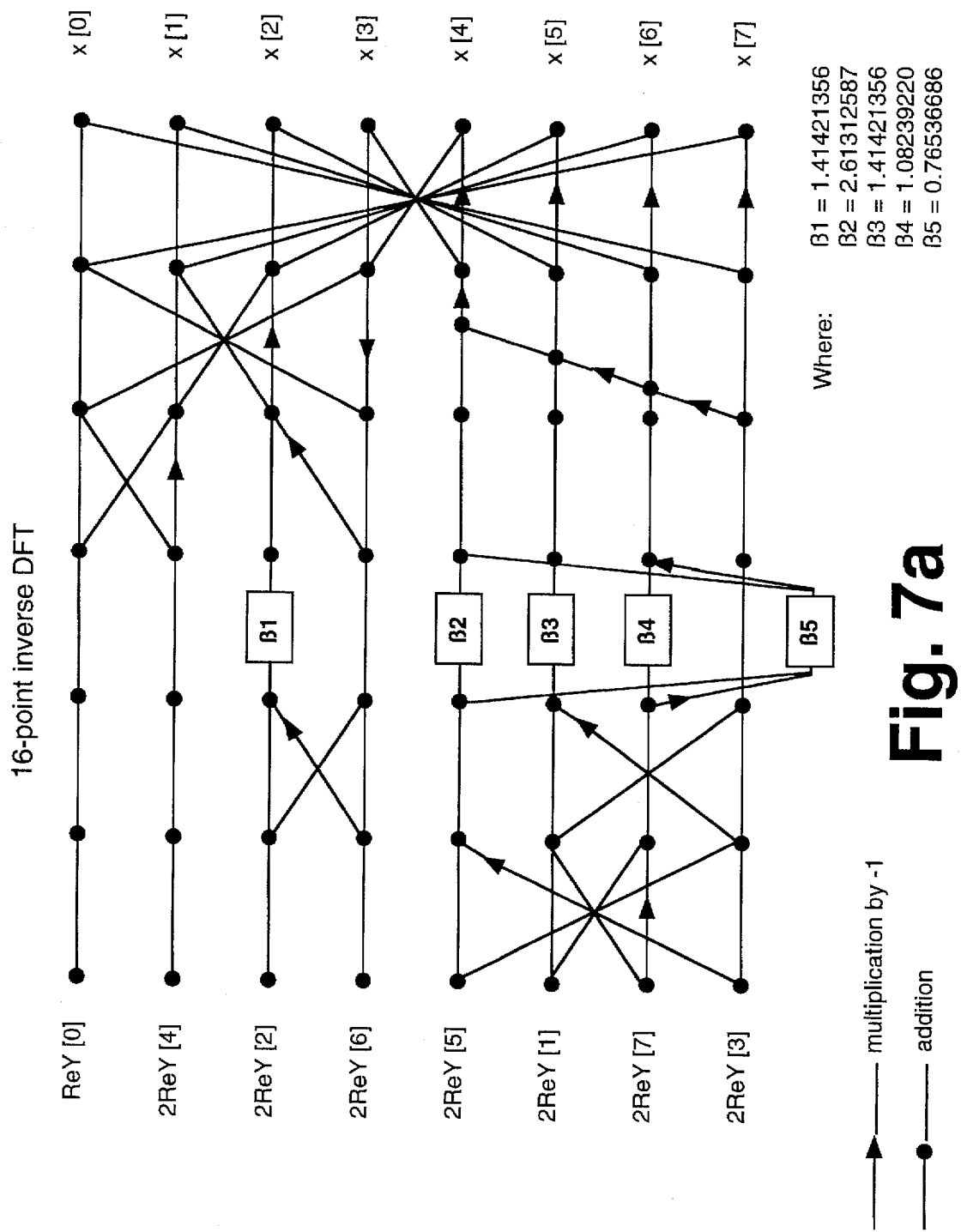
FIG. 7a illustrates a flow diagram of an inverse Winograd Discrete Fourier Transform algorithm.

To perform an inverse Discrete Cosine Transform, the steps of the Arai-Agui-Nakajima algorithm are performed in reverse order. Specifically, first the coefficients are scaled according to an inverse version of the Arai-Agui-Nakajima algorithm as illustrated in FIG. 6. After scaling, then an inverse of the Winograd DFT algorithm is performed. FIG. 7a illustrates the signal flow of the inverse Winograd DFT algorithm that restores the original values from the real parts of a 16-point DFT.

To implement the inverse Discrete Cosine Transform of FIGS. 6 and 7a, the present invention uses the packed instructions set 140 of the processor 109. In one embodiment, the packed instructions set 140 are used in conjunction with multimedia data stored in a packed word format where data is stored as four separate 16-bit data elements within a single multimedia register.

Each of the four separate 16-bit data elements will contain signed scalar data value. Since floating point arithmetic is usually required, the four separate 16-bit scalar data values will be interpreted as fixed point decimal values. However, the placement of the decimal point is implicit and therefore must be kept track of by the inverse Discrete Cosine Transform implementation.

The first step, as illustrated by FIG. 6, is to scale the input values appropriately. This can be done using a Packed Multiply instruction 146 that multiplies the packed data words. The multiply operation multiplies the input values with the corresponding scale factors from a table according to the algorithm of FIG. 6. However, to keep the significant digits from overflowing, the data is first shifted to the right using the Packed Shift Right Arithmetic instruction before the Packed Multiply instruction 146 instruction is executed.

Next, the 16-point inverse Discrete Fourier Transform is performed to restore the original values from the real parts of a previous 16-point Discrete Fourier Transform. The entire flow chart for performing this transform is illustrated in FIG. 7a. To efficiently perform transform with a computer processor that can operate on four words in parallel, the inverse Discrete Fourier Transform algorithm can be broken down into pieces.

Figure 7B:
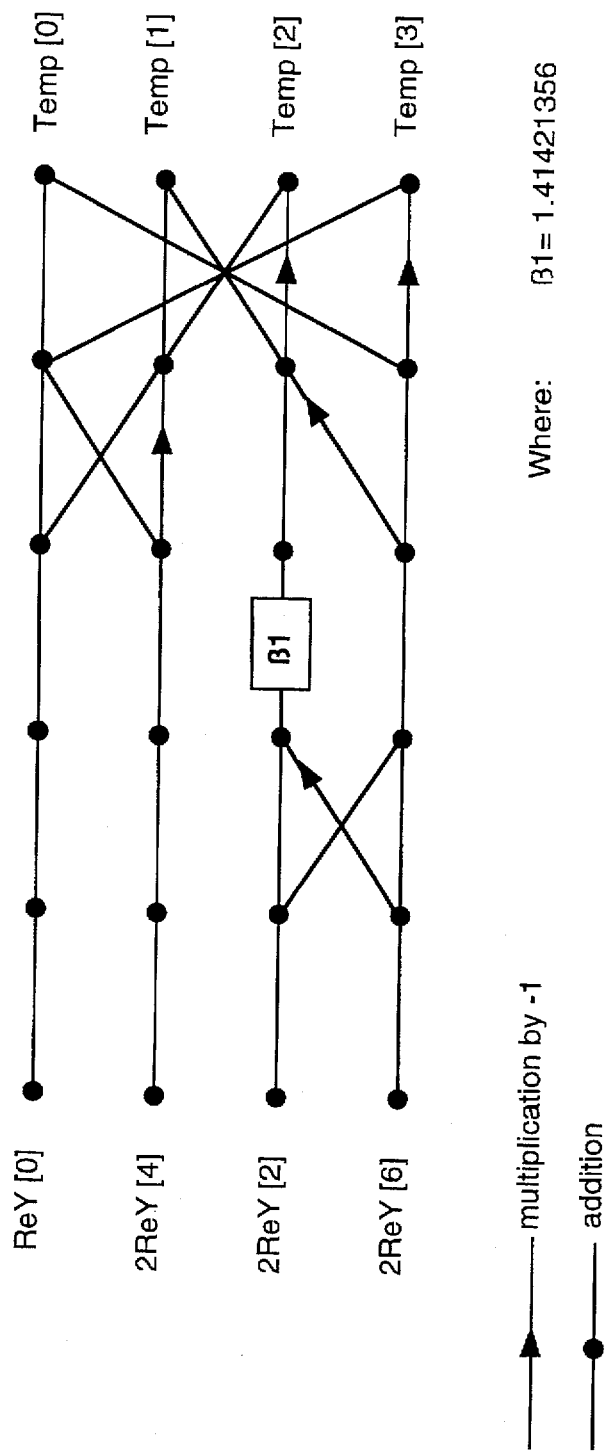
FIG. 7b illustrates a flow diagram of a first portion of the Winograd Discrete Fourier Transform algorithm that exhibits four way parallelism.

FIG. 7b illustrates a first portion of the inverse Discrete Fourier Transform algorithm that is performed. As illustrated by FIG. 7b, only four data values are operated upon. These four data values can be stored within a single multimedia register using the packed word format. By examining the data flow of the operations in FIG. 7b, it can be seen that all the mathematical operations can be performed in parallel since no dependencies exist. Thus the operations in FIG. 7b can be implemented using the Packed Multiply operation 146, the Packed Addition operation 142, and the Packed Subtraction operation 144.

After each operation during the algorithm, the data values stored in the multimedia registers may come close to overflowing or underflowing. To prevent this from occurring, the contents of the registers may be shifted right or shifted left in order to best preserve the significant digits for the next operation. The shift operations are performed using the Packed Shift Left Logical operation 141 and the Packed Shift Right Arithmetic operation 143. Note that in the present embodiment, all the packed word values must be shifted by the same amount. This must be taken into consideration when determining how much to shift each intermediate result. At the end of the data flow diagram of FIG. 7b, the four data values are stored as a temporary result.

Figure 7C:
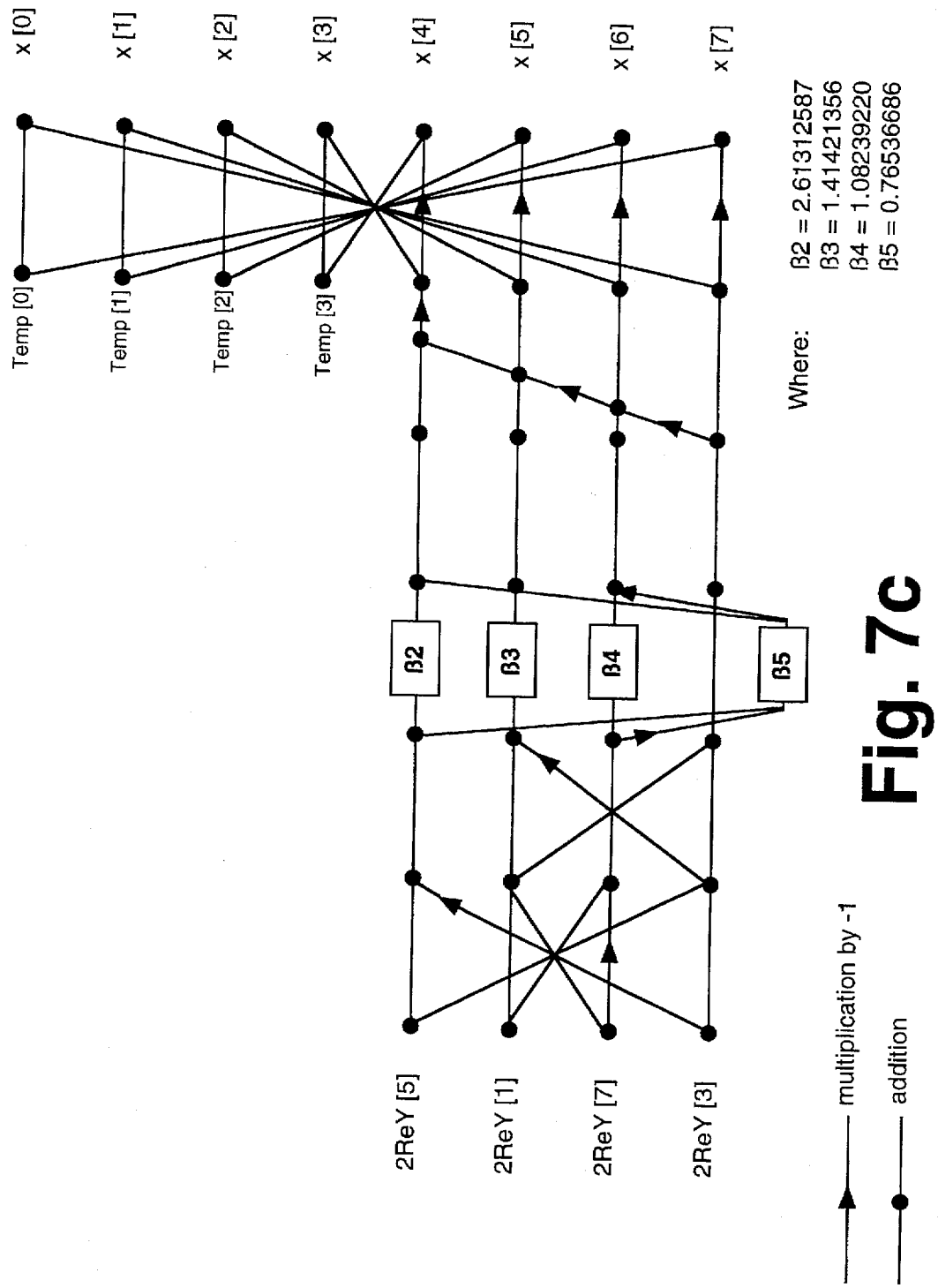
FIG. 7c illustrates a flow diagram of a second portion of the Winograd Discrete Fourier Transform algorithm that exhibits four way parallelism.

FIG. 7c illustrates a second portion of the inverse Discrete Fourier Transform algorithm that is performed. Like the data flow of FIG. 7b, only four data values are operated upon for most of the data flow in FIG. 7c. These four data values can also be stored within a single multimedia register using the packed word format and can also be operated upon concurrently. Near the end of the data flow diagram of FIG. 7c, the four temporary result values from FIG. 7b are combined to provide the results of the inverse Discrete Fourier Transform.

Since the Arai-Agui-Nakajima algorithm is only a one-dimensional iDCT, additional processing must be performed to compute an 8×8 iDCT that is commonly used in multimedia systems. To perform two-dimensional 8×8 iDCT, first the columns must be transformed using the one-dimensional Arai-Agui-Nakajima algorithm, then rows of the result are transformed using the one-dimensional Arai-Agui-Nakajima algorithm. Reversing this order by applying a one-dimensional Arai-Agui-Nakajima iDCT algorithm on the rows first, and then on the columns provides the same result.

While implementing the 8×8 iDCT in a particular SIMD instruction set, it was found that it was much more efficient to perform the Arai-Agui-Nakajima algorithm on columns than on rows. Applying the one dimensional Arai-Agui-Nakajima iDCT algorithm to rows of the matrix was much more complicated and less efficient. The following steps were proposed:

1. Prescale the input coefficients.
2. Perform a 1-d iDCT on the columns of the matrix.
3. Transpose the matrix.
4. Perform a second iDCT on the columns of the transposed matrix. (Which is equivalent to performing an iDCT on the rows of the original matrix.)
5. Transpose the matrix back.

As illustrated above, two seemingly unnecessary transpose operations are performed, so a method to reduce the costs of these steps was sought. The iDCT was being designed to be used in the context of the MPEG-2 decoding algorithm. To create the matrix to be transformed, a Zig-Zag scan is performed on the input data stream. Performing a matrix transposition during a Zig-Zag scan adds a negligible amount of time. Thus the following improved steps were implemented:

1. Transpose the input coefficients during the Zig-Zag scan.
2. Prescale the input coefficients of the transposed input matrix.
3. Perform a 1-d iDCT on the columns of the matrix. (Which is equivalent to performing an iDCT on the rows of the original matrix.)
4. Transpose the matrix.
5. Perform a second iDCT on the columns of the final matrix.

A detailed description of how the present invention implemented an 8×8 iDCT using the Arai-Agui-Nakajima iDCT algorithm can be found in Appendix A.

Use of the Inverse Discrete Cosine Transform Within a Multimedia System

FIGS. 8A and 8B show an application of the inverse discrete cosine transfer function in accordance with an embodiment of the present invention in which a multimedia information is manipulated by, for example, compressing the signal before storing, displaying, or transmitting its associated data. In other embodiments of the present invention, the inverse discrete cosine transfer function can be used on a computer system manipulate the multimedia data by performing decompression, filtering, or image edge processing and detection.

In FIG. 8A, the camera 800 transmits a moving-picture video signal to a receiving stage 800 within a first computer system 820 to which the camera is coupled. For an embodiment in which the present invention is implemented in conjunction with a video Conferencing application, the image received at receiving stage 802 is primarily an image of the operator of the first computer system 820 in communication with an operator of a remote second computer system 821. For an alternate embodiment in which the computer system operator desires to, for example, edit, store, or otherwise manipulate motion-picture or still-motion video, the output of a VCR, other video capture unit, another computer system, a CD-ROM, or other laser disk is fed to the receiving stage of the computer system.

Coupled to the video camera 800, or another multimedia input device such as a microphone, could be a digitizing unit which is in turn coupled to the bus of the computer. The multimedia input device receives an audio or image input, and the digitizing unit generates digital data representing the input. Thus, the digitizing unit includes, at least, an analog to digital converter located in the multimedia input device, an I/O expansion card, or hardwired on to the motherboard. Additionally, the digitizing unit could include filtering, data compression, data encryption, or other related steps to manipulate the data representing the images. These steps could be performed by hardware or software within the multimedia input device, and/or software executing on the processor of computer system 820.

At receiving stage 802, the data associated with the video signal is stored into a portion of computer system memory. This stored data represents, for example, digital samples of the video signal transmitted by the camera. For one embodiment, the data is organized such that each of a plurality of registers within the computer system memory contains a packed data set wherein each data element of the packed data set represents an associated pixel of a frame of the video image. For example, for one embodiment a 64 bit register contains 8 packed bytes, each byte being associated with a different pixel, wherein the value of each byte represents one of 256 possible colors of its associated pixel. A larger palette of colors may be used in an embodiment in which the 64 bit register contains 4 words, or a 128 bit register contains 8 words, each word being associated with a different pixel.

For another embodiment, two or more separate data elements are used to define an individual pixel. For example, in a red-green-blue (RGB) encoding scheme, one data element in a first packed data set defines the R value of a pixel; another data element in a second packed data set defines the G value of the same pixel; and a third data element in a third packed data set defines the B value of the same pixel. For an embodiment in which the Joint Photographers Expert Group (JPEG) standard or the Moving Pictures Experts Group (MPEG) standard is implemented, the encoding scheme separates the luminance of a pixel from the chrominance of that pixel, storing the data elements representing each of these in separate packed data sets. The luminance of a pixel represents the gray scale, or brightness, of the pixel while the chrominance represents the color of the pixel.

The human eye is more tolerant to errors in color than errors in brightness. By separating the data elements which represent pixel luminance from the data elements which represent pixel chrominance, the data elements representing luminance can be made larger than the data elements representing pixel chrominance, thereby ensuring higher precision of brightness for each pixel while economizing on the space used to store color information. For example, for one embodiment, the length of data elements used to represent luminance is twice the length of data elements used to represent chrominance. Another advantage to separately storing luminance and chrominance data elements is that different compression algorithms can be used to compress the luminance and chrominance data, optimizing each algorithm for the type of data to be compressed.

Note that in accordance with one embodiment of the present invention, digital sampling of the video signal is performed. Sampling of the video signal may be performed by an analog to digital converter either within receiving stage 802 or within camera 800. In the same manner, reconverting a sampled signal back into an analog signal may be performed by a digital to analog converter. Analog to digital and digital to analog converters can be implemented by dedicated hardware, such as digital signal processors. However, in order to avoid unnecessarily obscuring the present invention, waveform sampling is not described in detail here, and in the interest of clarity, all signals are illustrated in FIG. 8B as continuous waveforms.

Once the video signal has been stored as data in the computer system memory, the data is manipulated at compression stage 803, which may include compressing the data into a smaller memory space. In addition, in other embodiments of the present invention, the inverse Discrete Cosine Transform, at this stage, can be used on a computer system manipulate the multimedia data by performing decompression, filtering, or image edge processing and detection. Nevertheless, in FIG. 8, at stage 803, by occupying a smaller memory space, the video signal is more easily modified, stored, or transmitted because there is less data to modify, store, or transmit, requiring less processing power and system resources. As shown in FIG. 8B, the video signal 812, stored in memory registers of the computer system, is directed to compression stage 803. In the spatial domain, video signal 812 is represented by a waveform in which the amplitude of the signal is indicated by vertical displacement while time or space is indicated by horizontal displacement.

For many compression methods it is desirable to transform a signal from the spatial domain to another domain, such as the frequency domain, before analyzing or modifying the signal. After video signal 812 is received at compression stage 803, the signal is transformed from the spatial domain to the frequency domain. In the frequency domain, the amplitude of a particular frequency component (e.g. a sine or cosine wave) of the original signal is indicated by vertical displacement while the frequency of each frequency component of the original signal is indicated by horizontal displacement. The video waveform 812 is illustrated in the frequency domain at step 813 within compression stage 803.

In one embodiment, transformation of a signal from the spatial to the frequency domain involves performing a Discrete Cosine Transform of the data elements representing the signal. For example, in accordance with some JPEG and MPEG standards, square subregions of the video image, generally an 8×8 array of pixels, are transformed from the spatial domain to the frequency domain using a discrete cosine transform function. This 8×8 array of pixels corresponds to eight memory registers, each containing packed data sets of eight data elements, each data element corresponding to the value (e.g. color, brightness, etc.) of its associated pixel in the 8×8 array. For another embodiment, other transform functions are implemented such as, for example, a Fourier transform, a fast Fourier transform, a fast Hartley transform, or a wavelet transform.

Once transformed into the frequency domain, individual frequency components of the signal can be selectively analyzed, attenuated, amplified, or discarded. Filtering is a technique in which certain frequency components of a signal are modified. By selecting an appropriate filter function which discards certain frequency components without significantly degrading the appearance of the video image, the video signal is thereby compressed because there are fewer frequency components which define the video image. Filtering of frequency components of the video signal in this manner is implemented at step 814 within compression stage 803.

Each frequency component of the waveform is multiplied by an associated coefficient of a low-pass filter function, or, where the associated coefficient is 0, the frequency component is simply not calculated as part of the transform function. As illustrated in FIG. 8B, a low-pass filter eliminates or attenuates higher frequency components of the waveform, allowing lower frequency components to pass through. Higher frequency components are frequencies above a predetermined limit (referred to as the "cutoff frequency" in some applications), while lower frequency components are frequencies below this predetermined limit.

Note that frequency components of a waveform can be manipulated in the frequency domain using other techniques in accordance with other embodiments of the present invention. For one embodiment, an audio waveform transmitted by microphone 801 is analyzed and manipulated in a similar manner by computer system 820. For example, upper harmonic analyses of audio waveforms in the frequency domain are conducted in accordance with voice recognition applications. As another example, the harmonic spectrum of audio waveforms are modulated over time to imitate the sounds of voices, sound effects, or musical instruments. In conjunction with sound transmission or storage applications, the audio waveform is compressed by filtering techniques.

Video images can be similarly manipulated in the frequency domain to do more than merely compress the video data. For example, for one embodiment of the present invention, a high-pass filter is applied to a video signal in an edge detection technique. A high-pass filter eliminates or attenuates lower frequency components of the signal, allowing higher frequency components to pass through. Because sharp, high-contrast edges of a video image generally correspond to high frequency components of the associated video signal, a high-pass filter will isolate these edges. This technique may be found useful in motion and image detection and recognition applications. Also, this technique may be found to have applications in predictive vector quantization compression in which the motion of boundaries in consecutive frames of a moving-picture video signal are tracked and predicted to generate successive images.

For one embodiment of the present invention, after the video signal is filtered, the signal is reconverted back into the spatial domain by applying an inverse transform to the data. Alternatively, the signal remains in the frequency domain and is transformed back into the spatial domain during the decompression stage, as described below. Removal of these high frequency components from the original video signal does not significantly degrade picture quality. In general, the more a signal is compressed, the greater the loss of image fidelity. Because the human eye is more sensitive to errors in luminance than in chrominance, as stated above, the chrominance portion of the video signal is more highly compressed than the luminance portion.

In addition, in accordance with JPEG, MPEG, and other video compression methods, differing degrees of compression may be applied to different regions of a video image to gain more compression in those regions requiring less image detail, and less compression in those regions requiring more detail. For an embodiment in which image quality is not of the essence, such as, for example, in a video conferencing application, high compression with lower frame rates is appropriate. High compression is appropriate because a user generally need only be able to discern the face of the speaker, without intricate detail. Lower frame rates are appropriate because there is likely to be little movement of objects in the video image. One way of achieving higher compression is to simply narrow the low-pass filter function applied to the video signal, thereby removing more higher frequency components.

Additional compression is achieved by truncating the precision of the data and then using a coding scheme to store repetitious terms in an efficient manner. In accordance with the MPEG standard, additional compression is achieved by matching similar arrays of pixels in successive frames, and encoding only the differences or interpolations between frames. By compressing the video signal in this manner, the signal will occupy a smaller amount of space in memory. After compression, the signal is stored, displayed, and/or transmitted at step 816. For example, in accordance with the embodiment illustrated in FIG. 8A, after the video signal leaves compression stage 803, the signal enters transmission stage 804 which transmits the compressed video signal to the receiving stage 807 of a second computer system 821. Because the video signal is compressed, the bandwidth required to transmit the signal from transmitter 804 to receiver 807 is greatly reduced, permitting, for example, phone lines to be used for the transmission. For one embodiment of the present invention, in addition to transmitting the video signal, the video signal is encrypted at transmission stage 804.

Upon receiving the compressed video signal at receiving stage 807, the data associated with the signal is loaded into computer system memory. In addition, if the video signal is encrypted, it is decrypted here. At decompression stage 808, the signal is decompressed by a method including, for example, applying an inverse transform to the data to translate the signal back into the spatial domain. This assumes the signal has been transmitted in a compressed format in the frequency domain from computer system 820. For an embodiment in which the compressed video signal is transmitted in the spatial domain, application of an inverse transform during the decompression stage may not be necessary. However, decompression of an audio or video signal may be more easily accomplished in the frequency domain, requiring a spatial domain signal received by decompression stage 808 to be transformed into the frequency domain for decompression, then back into the spatial domain for display.

Once decompressed, the signal is transferred to display stage 809, which may comprise a video RAM (VRAM) array, and the image is displayed on display device 811. Using this technique, a user at computer system 820 can transmit a video image to computer system 821 for viewing at the second computer terminal. In addition, audio information gathered by microphone 801 can be compressed and transmitted by computer system 820 to computer system 821, with playback available from speakers 810. Similarly, computer system 821 may have similar video and audio transmission capabilities (not shown), allowing display and audio playback on display device 806 and speakers 805, respectively, of computer system 820. In this manner, applications such as video conferencing are enabled.

From the above description, it will be apparent that the invention disclosed herein provides a novel, accelerated, and advantageous computer system for performing an inverse Discrete Cosine Transform of packed data representing multimedia information. As will be understood by those familiar with the art, the invention may be embodied in other specific forms without departing from its essential features, and thus, the described embodiments are not restrictive of the scope of the invention. The following claims are indicative of the scope of the invention, and all variations which come within the meaning and range of equivalency of the claims are to be embraced within their scope.

Appendix A

To implement an 8×8 inverse Discrete Cosine Transform (iDCT), the one-dimensional Arai-Agui-Nakajima iDCT algorithm was used on the columns and rows of an 8×8 matrix. In the present embodiment, a Single Instruction Multiple Data (SIMD) instruction set was used to implement the invention. In the SIMD instruction set, instructions that operated on 4 separate 16-bit values were used. to break up the 8×8 matrices into 4 data value pieces, the following structure was chosen:

|      |      |              |                  |                  |
| ---- | ---- | ------------ | ---------------- | ---------------- |
| M1   | M2   |              |                  |                  |
| M3   | M4   |              |                  |                  |

With this structure, a transpose of the matrix can be implemented as follows:

| M1 | M2 |             | M1$^t$ | M3$^t$ |
| -- | -- | ----------- | ------ | ------ |
| M3 | M4 | --transpose--> | M2$^t$ | M4$^t$ |

The full implementation of the 8×8 is provided in the following program listing. An outline of the steps that are performed, by the code are provided to simplify the reading of the code:

1. Prescale: 16 packed multiplies
2. Column 0: even part
3. Column 0: odd part
4. Column 0: output butterfly
5. Column 1: even part
6. Column 1: odd part
7. Column 1: output butterfly
8. Transpose: M4 part
9. Transpose: M3 part
10. Column 1: even part (after transpose)
11. Column 1: odd part (after transpose)
12. Column 1: output butterfly (after transpose)
13. Transpose: M2 part
14. Transpose: M1 part
15. Column 0: even part (after transpose)
16. Column 0: odd part (after transpose)
17. Column 0: output butterfly (after transpose)
18. Clean up.

where:
- a. Column 0 represents the first four columns and Column 1 represents the other four columns.
- b. Even part represents the part of the Arai-Agui-Nakajima iDCT algorithm that uses even indexed elements.
- b. Odd part represents the part of the Arai-Agui-Nakajima iDCT algorithm that uses odd indexed elements; and
- d. Output butterfly represents the end step of the Arai-Agui-Nakajima iDCT algorithm that generates the one-dimensional iDCT using the results of the even and odd parts

6.0. Two-dimensional iDCT Code Listing

```
; esi - input and output data pointer
; the input data is tranposed and each 16 bit element in the 8x8
matrix is left aligned:
; e.g. in 11...1110000 format
; If the iDCT is of I macroblock then 0.5 needs to be added to
the DC Component
; (element[0][0] of the matrix)

.nolist
include iammx.inc                  ; IAMMX Emulator Macros
MMWORD   TEXTEQU   <DWORD>
.list .586
.model flat _DATA SEGMENT PARA PUBLIC USE32 'DATA'
x0005000200010001      DQ 0005000200010001h
x0040000000000000      DQ 40000000000000h
x5a825a825a825a82   DW 5a82h, 5a82h. 5a82h, 5a82h  ; 23170
x539f539f539f539f   DW 539fh, 539fh, 539fh, 539fh  ; 21407
x4546454645464546   DW 4546h, 4546h, 4546h, 4546h  ; 17734
x61f861f861f861f8   DW 61f8h, 61f8h, 61f8h, 61f8h  ; 25080
scratch1 DQ 0
scratch3 DQ 0
scratch5 DQ 0
scratch7 DQ 0
; for debug only
x0    DQ 0 preSC DW 16384, 22725, 21407, 19266,   16384, 12873,  8867, 4520
      DW 22725, 31521, 29692, 26722,   22725, 17855, 12299, 6270
      DW 21407, 29692, 27969, 25172,   21407, 16819, 11585, 5906
      DW 19266, 26722, 25172, 22654,   19266, 15137, 10426, 5315
      DW 16384, 22725, 21407, 19266,   16384, 12873,  8867, 4520
      DW 12873, 17855, 16819, 15137,   25746, 20228, 13933, 7103
      DW 17734, 24598, 23170, 20853,   17734, 13933,  9597, 4892
      DW 18081, 25080, 23624, 21261,   18081, 14206,  9785, 4988
```

```
_DATA ENDS

_TEXT SEGMENT PARA PUBLIC USE32 'CODE'

COMMENT ^
void idct8x8aan (
    int16 *src_result);
^ public  _idct8x8aan
_idct8x8aan proc near push ebp
lea  ecx, [preSC]

mov  ebp, esp
push esi mov  esi, DWORD PTR [ebp+8]     ; source
;slot

; column 0: even part
; use V4, V12, V0, V8 to produce V22..V25
movq mm0, mmword ptr [ecx+8*12]       ; maybe the first mul can
be done together
                                ; with the dequantization in iHuff
module ?
;slot pmulhw mm0, mmword ptr [esi+8*12] ; V12
;slot movq mm1, mmword ptr [ecx+8*4]
;slot pmulhw mm1, mmword ptr [esi+8*4] ; V4
;slot movq mm3, mmword ptr [ecx+8*0]
psraw mm0, 1                          ; t64=t66 pmulhw mm3, mmword ptr [esi+8*0] ; V0
;slot
```

```
movq mm5, mmword ptr [ecx+8*8]
movq mm2, mm1                           ; duplicate V4 pmulhw mm5, mmword ptr [esi+8*8] ; V8
psubsw mm1, mm0                         ; V16 pmulhw mm1, mmword ptr x5a825a825a825a82  ; 23170 ->V18
paddsw mm2, mm0                         ; V17 movq mm0, mm2                           ; duplicate V17
psraw mm2, 1                            ; t75=t82 psraw mm0, 2                            ; t72
movq mm4, mm3                           ; duplicate V0 paddsw mm3, mm5                          ; V19
psubsw mm4, mm5                          ; V20 ;mm5 free ;moved from the block below
movq mm7, mmword ptr [ecx+8*10]
psraw mm3, 1                            ; t74=t81 movq mm6, mm3                           ; duplicate t74=t81
psraw mm4, 2                            ; t77=t79 psubsw mm1, mm0                          ; V21 ; mm0 free
paddsw mm3, mm2                          ; V22 movq mm5, mm1                           ; duplicate V21
paddsw mm1, mm4                          ; V23 movq mmword ptr [esi+8*4], mm3          ; V22
psubsw mm4, mm5                          ; V24; mm5 free movq mmword ptr [esi+8*12], mm1         ; V23
psubsw mm6, mm2                          ; V25; mm2 free movq mmword ptr [esi+8*0], mm4          ; V24
;slot ; keep mm6 alive all along the next block
;movq mmword ptr [esi+8*8], mm6         ; V25
```

```
; column 0: odd part
; use V2, V6, V10, V14 to produce V31, V39, V40, V41

;moved above
;movq mm7, mmword ptr [ecx+8*10]

pmulhw mm7, mmword ptr [esi+8*10]; V10
;slot movq mm0, mmword ptr [ecx+8*6]
;slot pmulhw mm0, mmword ptr [esi+8*6]  ; V6
;slot movq mm5, mmword ptr [ecx+8*2]
movq mm3, mm7                           ; duplicate V10 pmulhw mm5, mmword ptr [esi+8*2]  ; V2
;slot movq mm4, mmword ptr [ecx+8*14]
psubsw mm7, mm0                         ; V26 pmulhw mm4, mmword ptr [esi+8*14]; V14
paddsw mm3, mm0                         ; V29 ; free mm0 movq mm1, mm7                           ; duplicate V26
psraw mm3, 1                            ; t91=t94 pmulhw mm7, mmword ptr x539f539f539f539f ; V33
psraw mm1, 1                            ; t96 movq mm0, mm5                           ; duplicate V2
psraw mm4, 2                            ; t85=t87 paddsw mm5, mm4                         ; V27
psubsw mm0, mm4                         ; V28 ; free mm4 movq mm2, mm0                           ; duplicate V28
psraw mm5, 1                            ; t90=t93
```

```
pmulhw mm0, mmword ptr x4546454645464546  ; V35
psraw mm2, 1                              ; t97 movq mm4, mm5                             ; duplicate t90=t93
psubsw mm1, mm2                           ; V32 ; free mm2 pmulhw mm1, mmword ptr x61f861f861f861f8  ; V36
psllw mm7, 1                              ; t107 paddsw mm5, mm3                           ; V31
psubsw mm4, mm3                           ; V30 ; free mm3 pmulhw mm4, mmword ptr x5a825a825a825a82  ; V34
nop ;slot psubsw mm0, mm1                           ; V38
psubsw mm1, mm7                           ; V37 ; free mm7 psllw mm1, 1                              ; t114
;move from the next block
movq mm3, mm6                             ; duplicate V25

;move from the next block
movq mm7, mmword ptr [esi+8*4]            ; V22
psllw mm0, 1                              ; t110 psubsw mm0, mm5                           ; V39 (mm5 still
needed for next block)
psllw mm4, 2                              ; t112

;move from the next block
movq mm2, mmword ptr [esi+8*12]           ; V23
psubsw mm4, mm0                           ; V40 paddsw mm1, mm4                           ; V41; free mm0
;move from the next block
psllw mm2, 1                              ; t117=t125

; column 0: output butterfly
;move above
;movq mm3, mm6                            ; duplicate V25
;movq mm7, mmword ptr [esi+8*4]           ; V22
;movq mm2, mmword ptr [esi+8*12]          ; V23
```

```
;psllw mm2, 1                           ; t117=t125 psubsw mm6, mm1                         ; tm6
paddsw mm3, mm1                         ; tm8; free mm1 movq mm1, mm7                           ; duplicate V22
paddsw mm7, mm5                         ; tm0 movq mmword ptr [esi+8*8], mm3          ; tm8; free mm3
psubsw mm1, mm5                         ; tm14; free mm5 movq mmword ptr [esi+8*6], mm6          ; tm6; free mm6
movq mm3, mm2                           ; duplicate t117=t125 movq mm6, mmword ptr [esi+8*0]          ; V24
paddsw mm2, mm0                         ; tm2 movq mmword ptr [esi+8*0], mm7          ; tm0; free mm7
psubsw mm3, mm0                         ; tm12; free mm0 movq mmword ptr [esi+8*14], mm1         ; tm14; free mm1
psllw mm6, 1                            ; t119=t123 movq mmword ptr [esi+8*2], mm2          ; tm2; free mm2
movq mm0, mm6                           ; duplicate t119=t123 movq mmword ptr [esi+8*12], mm3         ; tm12; free mm3
paddsw mm6, mm4                         ; tm4

;moved from next block
movq mm1, mmword ptr [ecx+8*5]
psubsw mm0, mm4                         ; tm10; free mm4

;moved from next block
pmulhw mm1, mmword ptr [esi+8*5]  ; V5
;slot movq mmword ptr [esi+8*4], mm6          ; tm4; free mm6
;slot movq mmword ptr [esi+8*10], mm0         ; tm10; free mm0
;slot
```

```
; column 1: even part
; use V5, V13, V1, V9 to produce V56..V59
;moved to prev block
;movq mm1, mmword ptr [ecx+8*5]
;pmulhw mm1, mmword ptr [esi+8*5]; V5 movq mm7, mmword ptr [ecx+8*13]
psllw mm1, 1                                ; t128=t130 pmulhw mm7, mmword ptr [esi+8*13]; V13
movq mm2, mm1                               ; duplicate t128=t130 movq mm3, mmword ptr [ecx+8*1]
;slot pmulhw mm3, mmword ptr [esi+8*1] ; V1
;slot movq mm5, mmword ptr [ecx+8*9]
psubsw mm1, mm7                             ; V50 pmulhw mm5, mmword ptr [esi+8*9] ; V9
paddsw mm2, mm7                             ; V51 pmulhw mm1, mmword ptr x5a825a825a825a82    ; 23170 ->V52
movq mm6, mm2                               ; duplicate V51 psraw mm2, 1                                ; t138=t144
movq mm4, mm3                               ; duplicate V1 psraw mm6, 2                                ; t136
paddsw mm3, mm5                             ; V53 psubsw mm4, mm5                             ; V54 ;mm5 free
movq mm7, mm3                               ; duplicate V53

;moved from next block
movq mm0, mmword ptr [ecx+8*11]
psraw mm4, 1                                ; t140=t142 psubsw mm1, mm6                             ; V55 ; mm6 free
paddsw mm3, mm2                             ; V56
```

```
movq mm5, mm4                           ; duplicate t140=t142
paddsw mm4, mm1                            ; V57 movq mmword ptr [esi+8*5], mm3          ; V56
psubsw mm5, mm1                            ; V58; mm1 free movq mmword ptr [esi+8*13], mm4         ; V57
psubsw mm7, mm2                            ; V59; mm2 free movq mmword ptr [esi+8*9], mm5          ; V58
;slot ; keep mm7 alive all along the next block
;movq mmword ptr [esi+8*1], mm7         ; V59

;moved above
;movq mm0, mmword ptr [ecx+8*11]

pmulhw mm0, mmword ptr [esi+8*11]; V11
;slot movq mm6, mmword ptr [ecx+8*7]
;slot pmulhw mm6, mmword ptr [esi+8*7] ; V7
;slot movq mm4, mmword ptr [ecx+8*15]
movq mm3, mm0                           ; duplicate V11 pmulhw mm4, mmword ptr [esi+8*15]; V15
;slot movq mm5, mmword ptr [ecx+8*3]
psllw mm6,1                             ; t146=t152 pmulhw mm5, mmword ptr [esi+8*3] ; V3
paddsw mm0, mm6                            ; V63

; note that V15 computation has a correction step:
; this is a 'magic' constant that rebiases the results to be
closer to the expected result
```

```
; this magic constant can be refined to reduce the error even more
; by doing the correction step in a later stage when the number is actually multiplied by 16
paddw  mm4, mmword ptr x0005000200010001
psubsw mm3, mm6                          ; V60 ; free mm6 psraw  mm0, 1                            ; t154=t156
movq   mm1, mm3                          ; duplicate V60 pmulhw mm1, mmword ptr x539f539f539f539f ; V67
movq   mm6, mm5                          ; duplicate V3 psraw  mm4, 2                            ; t148=t150
;slot paddsw mm5, mm4                          ; V61
psubsw mm6, mm4                          ; V62 ; free mm4 movq   mm4, mm5                          ; duplicate V61
psllw  mm1, 1                            ; t169 paddsw mm5, mm0                          ; V65 -> result
psubsw mm4, mm0                          ; V64 ; free mm0 pmulhw mm4, mmword ptr x5a825a825a825a82 ; V68
psraw  mm3, 1                            ; t158 psubsw mm3, mm6                          ; V66
movq   mm2, mm5                          ; duplicate V65 pmulhw mm3, mmword ptr x61f861f861f861f8 ; V70
psllw  mm6, 1                            ; t165 pmulhw mm6, mmword ptr x4546454645464546 ; V69
psraw  mm2, 1                            ; t172

;moved from next block
movq   mm0, mmword ptr [esi+8*5]         ; V56
psllw  mm4, 1                            ; t174

;moved from next block
psraw  mm0, 1                            ; t177=t188
```

```
nop ; slot psubsw mm6, mm3                          ; V72
psubsw mm3, mm1                          ; V71 ; free mm1 psubsw mm6, mm2                          ; V73 ; free mm2
;moved from next block
psraw mm5, 1                             ; t178=t189 psubsw mm4, mm6                          ; V74
;moved from next block
movq mm1, mm0                            ; duplicate t177=t188 paddsw mm3, mm4                          ; V75
;moved from next block
paddsw mm0, mm5                          ; tm1

;location
;   5 - V56
;  13 - V57
;   9 - V58
;   X - V59, mm7
;   X - V65, mm5
;   X - V73, mm6
;   X - V74, mm4
;   X - V75, mm3
; free mm0, mm1 & mm2
;move above
;movq mm0, mmword ptr [esi+8*5]          ; V56
;psllw mm0, 1                            ; t177=t188 ! new !!
;psllw mm5, 1                            ; t178=t189 ! new !!
;movq mm1, mm0                           ; duplicate t177=t188
;paddsw mm0, mm5                         ; tm1 movq mm2, mmword ptr [esi+8*13]          ; V57
psubsw mm1, mm5                          ; tm15; free mm5 movq mmword ptr [esi+8*1], mm0           ; tm1; free mm0
psraw mm7, 1                             ; t182=t184 ! new !!

;save the store as used directly in the transpose
;movq mmword ptr [esi+8*15], mm1         ; tm15; free mm1
movq mm5, mm7                            ; duplicate t182=t184
```

```
psubsw mm7, mm3                              ; tm7 paddsw mm5, mm3                              ; tm9; free mm3
;slot movq mm0, mmword ptr [esi+8*9]               ; V58
movq mm3, mm2                                ; duplicate V57 movq mmword ptr [esi+8*7], mm7               ; tm7; free mm7
psubsw mm3, mm6                              ; tm13 paddsw mm2, mm6                              ; tm3 ; free mm6
; moved up from the transpose
movq mm7, mm3

; moved up from the transpose
punpcklwd mm3, mm1
movq mm6, mm0                                ; duplicate V58 movq mmword ptr [esi+8*3], mm2               ; tm3; free mm2
paddsw mm0, mm4                              ; tm5 psubsw mm6, mm4                              ; tm11; free mm4
; moved up from the transpose
punpckhwd mm7, mm1 movq mmword ptr [esi+8*5], mm0               ; tm5; free mm0
; moved up from the transpose
movq mm2, mm5

; transpose - M4 part
; ---------       ---------
; | M1 | M2 |     | M1'| M3'|
; ---------  -->  ---------
; | M3 | M4 |     | M2'| M4'|
; ---------       ---------
; Two alternatives: use full mmword approach so the following
code can be
; scheduled before the transpose is done without stores, or use
the fatser
; half mmword stores (when it possible)

movdf dword ptr [esi+8*9+4], mm3 ; MS part of tmt9
```

```
punpcklwd mm5, mm6 movdf dword ptr [esi+8*13+4], mm7 ; MS part of tmt13
punpckhwd mm2, mm6 movdf dword ptr [esi+8*9], mm5        ; LS part of tmt9
punpckhdq mm5, mm3                    ; free mm3 movdf dword ptr [esi+8*13], mm2       ; LS part of tmt13
punpckhdq mm2, mm7                    ; free mm7

; moved up from the M3 transpose
movq mm0, mmword ptr [esi+8*8]
;slot

; moved up from the M3 transpose
movq mm1, mmword ptr [esi+8*10]
; moved up from the M3 transpose
movq mm3, mm0

; shuffle the rest of the data, and write it with 2 mmword writes
movq mmword ptr [esi+8*11], mm5  ; tmt11
; moved up from the M3 transpose
punpcklwd mm0, mm1 movq mmword ptr [esi+8*15], mm2       ; tmt15
; moved up from the M3 transpose
punpckhwd mm3, mm1

; transpose - M3 part

; moved up to previous code section
;movq mm0, mmword ptr [esi+8*8]
;movq mm1, mmword ptr [esi+8*10]
;movq mm3, mm0
;punpcklwd mm0, mm1
;punpckhwd mm3, mm1 movq mm6, mmword ptr [esi+8*12]
;slot movq mm4, mmword ptr [esi+8*14]
movq mm2, mm6
```

```
; shuffle the data and write out the lower parts of the trasposed
in 4 dwords
punpcklwd mm6, mm4
movq     mm1, mm0 punpckhdq mm1, mm6
movq     mm7, mm3 punpckhwd mm2, mm4   ; free mm4
;slot punpckldq mm0, mm6                      ; free mm6
;slot ;moved from next block
movq     mm4, mmword ptr [esi+8*13]     ; tmt13
punpckldq mm3, mm2 punpckhdq mm7, mm2                      ; free mm2
;moved from next block
movq     mm5, mm3                       ; duplicate tmt5

; column 1: even part (after transpose)

;moved above
;movq     mm5, mm3                      ; duplicate tmt5
;movq     mm4, mmword ptr [esi+8*13]    ; tmt13 psubsw   mm3, mm4                       ; V134
;slot pmulhw   mm3, mmword ptr x5a825a825a825a82   ; 23170 ->V136
;slot movq     mm6, mmword ptr [esi+8*9]      ; tmt9
paddsw   mm5, mm4                       ; V135 ; mm4 free movq     mm4, mm0                       ; duplicate tmt1
paddsw   mm0, mm6                       ; V137 psubsw   mm4, mm6                       ; V138 ; mm6 free
psllw    mm3, 2                         ; t290
```

DHJ        --46--        42390.P3250

```
psubsw mm3, mm5                                    ; V139
movq mm6, mm0                                      ; duplicate V137 paddsw mm0, mm5                                    ; V140
movq mm2, mm4                                      ; duplicate V138 paddsw mm2, mm3                                    ; V141
psubsw mm4, mm3                                    ; V142 ; mm3 free movq mmword ptr [esi+8*9], mm0      ; V140
psubsw mm6, mm5                                    ; V143 ; mm5 free ;moved from next block
movq mm0, mmword ptr[esi+8*11]      ; tmt11
;slot movq mmword ptr [esi+8*13], mm2  ; V141
;moved from next block
movq mm2, mm0                                      ; duplicate tmt11

; column 1: odd part (after transpose)

;moved up to the prev block
;movq mm0, mmword ptr[esi+8*11]     ; tmt11
;movq mm2, mm0                                     ; duplicate tmt11 movq mm5, mmword ptr[esi+8*15]      ; tmt15
psubsw mm0, mm7                                    ; V144 movq mm3, mm0                                      ; duplicate V144
paddsw mm2, mm7                                    ; V147 ; free mm7 pmulhw mm0, mmword ptr x539f539f539f539f   ; 21407-> V151
movq mm7, mm1                                      ; duplicate tmt3 paddsw mm7, mm5                                    ; V145
psubsw mm1, mm5                                    ; V146 ; free mm5 psubsw mm3, mm1                                    ; V150
movq mm5, mm7                                      ; duplicate V145 pmulhw mm1, mmword ptr x4546454645464546    ; 17734-> V153
```

```
psubsw mm5, mm2                                    ; V148 pmulhw mm3, mmword ptr x61f861f861f861f8      ; 25080-> V154
psllw mm0, 2                                   ; t311 pmulhw mm5, mmword ptr x5a825a825a825a82      ; 23170-> V152
paddsw mm7, mm2                                ; V149 ; free mm2 psllw mm1, 1                                   ; t313
nop ; slot

;without the nop above - freeze here for one clock
;the nop cleans the mess a little bit
movq mm2, mm3                                  ; duplicate V154
psubsw mm3, mm0                                 ; V155 ; free mm0 psubsw mm1, mm2                                 ; V156 ; free mm2
;moved from the next block
movq mm2, mm6                                  ; duplicate V143

;moved from the next block
movq mm0, mmword ptr[esi+8*13]    ; V141
psllw mm1, 1                                   ; t315 psubsw mm1, mm7                                 ; V157 (keep V149)
psllw mm5, 2                                   ; t317 psubsw mm5, mm1                                 ; V158
psllw mm3, 1                                   ; t319 paddsw mm3, mm5                                 ; V159
;slot

; column 1: output butterfly (after transform)
;moved to the prev block
;movq mm2, mm6                                 ; duplicate V143
;movq mm0, mmword ptr[esi+8*13]   ; V141 psubsw mm2, mm3                                ; V163
paddsw mm6, mm3                                ; V164 ; free mm3 movq mm3, mm4                                  ; duplicate V142
psubsw mm4, mm5                                 ; V165 ; free mm5
```

```
movq mmword ptr scratch7, mm2       ; out7
psraw mm6, 4 psraw mm4, 4
paddsw mm3, mm5                     ; V162 movq mm2, mmword ptr[esi+8*9]       ; V140
movq mm5, mm0                       ; duplicate V141

;in order not to preculate this line up, we read [esi+8*9] very
near to this location
movq mmword ptr [esi+8*9], mm6      ; out9
paddsw mm0, mm1                     ; V161 movq mmword ptr scratch5, mm3       ; out5
psubsw mm5, mm1                     ; V166 ; free mm1 movq mmword ptr[esi+8*11], mm4      ; out11
psraw mm5, 4 movq mmword ptr scratch3, mm0       ; out3
movq mm4, mm2                       ; duplicate V140 movq mmword ptr[esi+8*13], mm5      ; out13
paddsw mm2, mm7                     ; V160

;moved from the next block
movq mm0, mmword ptr [esi+8*1]
psubsw mm4, mm7                     ; V167 ; free mm7

;moved from the next block
movq mm7, mmword ptr [esi+8*3]
psraw mm4, 4 movq mmword ptr scratch1, mm2       ; out1
;moved from the next block
movq mm1, mm0 movq mmword ptr[esi+8*15], mm4      ; out15
;moved from the next block
punpcklwd mm0, mm7
```

```
; transpose - M2 parts
;moved up to the prev block
;movq mm0, mmword ptr [esi+8*1]
;movq mm7, mmword ptr [esi+8*3]
;movq mm1, mm0
;punpcklwd mm0, mm7 movq mm5, mmword ptr [esi+8*5]
punpckhwd mm1, mm7 movq mm4, mmword ptr [esi+8*7]
movq mm3, mm5

; shuffle the data and write out the lower parts of the trasposed
in 4 dwords
movdf dword ptr [esi+8*8], mm0          ; LS part of tmt8
punpcklwd mm5, mm4 movdf dword ptr [esi+8*12], mm1   ; LS part of tmt12
punpckhwd mm3, mm4 movdf dword ptr [esi+8*8+4], mm5  ; MS part of tmt8
punpckhdq mm0, mm5                      ; tmt10 movdf dword ptr [esi+8*12+4], mm3       ; MS part of tmt12
punpckhdq mm1, mm3                      ; tmt14

; transpose - M1 parts
movq mm7, mmword ptr [esi]
;slot movq mm2, mmword ptr [esi+8*2]
movq mm6, mm7 movq mm5, mmword ptr [esi+8*4]
punpcklwd mm7, mm2 movq mm4, mmword ptr [esi+8*6]
punpckhwd mm6, mm2 ; free mm2 movq mm3, mm5
punpcklwd mm5, mm4
```

```
paddsw mm5, mm3              ; out2
psraw mm1, 4 movq mmword ptr[esi], mm7    ; out0 ; free mm7
psraw mm5, 4 movq mmword ptr[esi+8*14], mm1   ; out14 ; free mm1
psubsw mm2, mm3              ; out12 ; free mm3 movq mmword ptr[esi+8*2], mm5    ; out2 ; free mm5
psraw mm2, 4

;moved up to the prev block
movq mm4, mmword ptr scratch7
;moved up to the prev block
psraw mm0, 4 movq mmword ptr[esi+8*12], mm2   ; out12 ; free mm2
;moved up to the prev block
psraw mm6, 4

;move back the data to its correct place
;moved up to the prev block
;movq mm0, mmword ptr scratch3
;movq mm6, mmword ptr scratch5
;movq mm4, mmword ptr scratch7
;psraw mm0, 4
;psraw mm6, 4 movq mm1, mmword ptr scratch1
psraw mm4, 4 movq mmword ptr [esi+8*3], mm0   ; out3
psraw mm1, 4 movq mmword ptr [esi+8*5], mm6   ; out5
;slot movq mmword ptr [esi+8*7], mm4   ; out7
;slot movq mmword ptr [esi+8*1], mm1   ; out1
```

```
psllw mm0, 2           ; t266 movq mmword ptr[esi+8*0], mm1    ; save V115
psllw mm5, 1           ; t268 psubsw mm5, mm4        ; V122
psubsw mm4, mm0        ; V121 ; free mm0 psllw mm5, 1           ; t270
;slot psubsw mm5, mm1        ; V123 ; free mm1
psllw mm2, 2           ; t272 psubsw mm2, mm5        ; V124 (keep V123)
psllw mm4, 1           ; t274 movq mmword ptr[esi+8*2], mm5    ; save V123 ; free mm5
paddsw mm4, mm2        ; V125 (keep V124)

; column 0: even part (after transpose)
movq mm0, mmword ptr[esi+8*12]   ; tmt12
movq mm3, mm6          ; duplicate tmt4 psubsw mm6, mm0        ; V100
paddsw mm3, mm0        ; V101 ; free mm0 pmulhw  mm6, mmword ptr  x5a825a825a825a82  ; 23170 ->V102
movq mm5, mm7          ; duplicate tmt0 movq mm1, mmword ptr[esi+8*8]    ; tmt8
;slot paddsw mm7, mm1        ; V103
psubsw mm5, mm1        ; V104 ; free mm1 movq mm0, mm7          ; duplicate V103
psllw mm6, 2           ; t245 paddsw mm7, mm3        ; V106
movq mm1, mm5          ; duplicate V104 psubsw mm6, mm3        ; V105
```

```
punpckhwd mm3, mm4  ; free mm4
movq mm2, mm7 movq mm4, mm6
punpckldq mm7, mm5  ; tmt0 punpckhdq mm2, mm5  ; tmt2 ; free mm5
;slot

; shuffle the rest of the data, and write it with 2 mmword writes
punpckldq mm6, mm3  ; tmt4
;move from next block
movq mm5, mm2       ; duplicate tmt2 punpckhdq mm4, mm3  ; tmt6 ; free mm3
;move from next block
movq mm3, mm0       ; duplicate tmt10

; column 0: odd part (after transpose)
;moved up to prev block
;movq mm3, mm0      ; duplicate tmt10
;movq mm5, mm2      ; duplicate tmt2 psubsw mm0, mm4     ; V110
paddsw mm3, mm4     ; V113 ; free mm4 movq mm4, mm0  ; duplicate V110
paddsw mm2, mm1     ; V111 pmulhw mm0, mmword ptr x539f539f539f539f     ; 21407-> V117
psubsw mm5, mm1     ; V112 ; free mm1 psubsw mm4, mm5     ; V116
movq mm1, mm2       ; duplicate V111 pmulhw mm5, mmword ptr x4546454645464546     ; 17734-> V119
psubsw mm2, mm3     ; V114 pmulhw mm4, mmword ptr x61f861f861f861f8     ; 25080-> V120
paddsw mm1, mm3     ; V115 ; free mm3 pmulhw mm2, mmword ptr x5a825a825a825a82     ; 23170-> V118
```

```
psubsw mm0, mm3         ; V109; free mm3 paddsw mm5, mm6         ; V107
psubsw mm1, mm6         ; V108 ; free mm6

; column 0: output butterfly (after transform)
movq mm3, mm1 ; duplicate V108
paddsw mm1, mm2         ; out4 psraw mm1, 4
psubsw mm3, mm2         ; out10 ; free mm2 psraw mm3, 4
movq mm6, mm0 ; duplicate V109 movq mmword ptr[esi+8*4], mm1       ; out4 ; free mm1
psubsw mm0, mm4         ; out6 movq mmword ptr[esi+8*10], mm3      ; out10 ; free mm3
psraw mm0, 4 paddsw mm6, mm4         ; out8 ; free mm4
movq mm1, mm7 ; duplicate V106 movq mmword ptr[esi+8*6], mm0       ; out6 ; free mm0
psraw mm6, 4 movq mm4, mmword ptr[esi+8*0] ; V115
;slot movq mmword ptr[esi+8*8], mm6       ; out8 ; free mm6
movq mm2, mm5 ; duplicate V107 movq mm3, mmword ptr[esi+8*2] ; V123
paddsw mm7, mm4         ; out0

;moved up from next block
movq mm0, mmword ptr scratch3
psraw mm7, 4

;moved up from next block
movq mm6, mmword ptr scratch5
psubsw mm1, mm4         ; out14 ; free mm4
```

```
;slot emms pop  esi
pop ebp ret  0

_idct8x8aan ENDP
_TEXT ENDS

END
```

What is claimed is:

1. A computer system comprising:
   a multimedia input device which generates an audio or video signal;
   a processor coupled to the multimedia input device;
   a memory device coupled to the processor and having stored therein an inverse Discrete Cosine Transform (iDCT) routine for transforming a matrix of packed data using a Single Instruction Multiple Data (SIMD) instruction set, said matrix of packed data comprising a plurality of input values representing said audio or video signal, said iDCT routine, when executed by said processor, causes said processor to perform the steps of:
   scaling said matrix of packed data by multiplying each one of said packed data by predetermined scale factors using the packed multiply high (PMULH) SIMD operation to produce a matrix of scaled data;
   performing a one-dimensional inverse Discrete Fourier Transform on the columns of said matrix of scaled data to produce a matrix of scaled, transformed data;
   transposing said matrix of scaled, transformed data to produce a transposed matrix;
   performing a second one-dimensional inverse Discrete Fourier Transform on the columns of said transposed matrix to produce a transposed, transformed matrix; and
   re-transposing said transposed, transformed matrix to complete said two-dimensional inverse Discrete Cosine Transform.

2. The computer system as claimed in claim 1 wherein said steps of performing a first and second one-dimensional inverse Discrete Fourier Transforms is accomplished using a Winograd inverse Fast Fourier Transform (FFT).

3. The computer system as claimed in claim 2 wherein said matrix of packed data is an 8×8 matrix and wherein said Winograd inverse FFT is a 16-Point inverse FFT.

4. The computer system as claimed in claim 3 wherein the step of performing an inverse Discrete Fourier Transform on one of said columns of said 8×8 matrix comprises:
   performing a first inverse Discrete Fourier Transform on four data values within said column;
   temporarily storing the result of said first inverse Discrete Fourier Transform;
   performing a second inverse Discrete Fourier Transform on the remaining four data values within said column; and
   combining the results from said first and second inverse Discrete Fourier Transforms to produce an entire column of transformed data.

5. The computer system as claimed in claim 4 wherein said data values of said 8×8 matrix are stored within multimedia registers in a fixed-point, packed data format.

6. The computer system as claimed in claim 5 wherein said matrix of input data is acquired through a zig-zag scan of multimedia MPEG data.

7. The computer system as claimed in claim 6 wherein said step of transposing said matrix is performed during said zig-zag scan of said multimedia MPEG data.

8. The computer system as claimed in claim 5 wherein said packed, fixed-point data stored in said multimedia registers is shifted using a SIMD packed shift right operation to preserve the significant digits of said data.

9. The computer system as claimed in claim 5 wherein said packed, fixed-point data stored in said multimedia registers is shifted using a SIMD packed shift right operation to preserve the significant digits of said data.

10. The computer system as claimed in claim 5 wherein each data element comprising said matrix of packed data represents a pixel of a frame of a video image.

11. The computer system for performing a two-dimensional inverse Discrete Cosine Transform as claimed in claim 1 wherein said two dimensional matrix of packed data is an 8×8 matrix comprising an upper-left quadrant, M1, an upper-right quadrant, M2, a lower-left quadrant, M3, and a lower-right quadrant, M4, each said quadrant comprising a 2×2 matrix of packed data, and wherein said step of transposing said matrix comprises the steps of:
   transposing each said 2×2 matrix to produce an upper-left transposed matrix, $M1^t$, an upper-right transposed matrix, $M2^t$, a lower-left transposed matrix, $M3^t$, and a lower-right transposed matrix, $M4^t$; and
   swapping said upper-right transposed matrix, $M2^t$, with said lower-left transposed matrix, $M3^t$.

12. A computer system comprising:
   a multimedia input device which generates an audio or video signal;
   a processor coupled to the multimedia input device;
   a memory device coupled to the processor and having stored therein an inverse Discrete Cosine Transform (iDCT) routine for transforming a two-dimensional matrix of MPEG data acquired through a zig-zag scan using a packed SIMD instruction set, said iDCT routine when executed by said processor causes said processor to perform the steps of:
   transposing said two-dimensional matrix of MPEG data during said zig-zag scan to create a transposed matrix of MPEG data;
   scaling said transposed matrix of MPEG data by multiplying each one of said MPEG data by predetermined scale factors using the packed multiply high (PMULH) SIMD operation to produce a matrix of scaled data;
   performing a one-dimensional inverse Discrete Cosine Transform on the columns of said matrix of scaled data to produce a matrix of scaled, transformed data;
   transposing said matrix of scaled, transformed data to produce a transposed matrix; and
   performing a second one-dimensional inverse Discrete Cosine Transform on the columns of said transposed matrix to complete said two-dimensional inverse Discrete Cosine Transform.

13. The computer system as claimed in claim 12 wherein said one-dimensional inverse Discrete Cosine Transform is an Arai-Agui-Nakajima inverse Discrete Cosine Transform.

14. The computer system as claimed in claim 12 wherein said two dimensional matrix of MPEG data is an 8×8 matrix comprising an upper-left quadrant, M1, an upper-right quadrant, M2, a lower-left quadrant, M3, and a lower-right quadrant, M4, each said quadrant comprising a 2×2 matrix of packed data, and wherein said step of transposing said matrix comprises the steps of:
   transposing each said 2×2 matrix to produce an upper-left transposed matrix, $M1^t$, an upper-right transposed matrix, $M2^t$, a lower-left transposed matrix, $M3^t$, and a lower-right transposed matrix, $M4^t$; and
   swapping said upper-right transposed matrix, $M2^t$, with said lower-left transposed matrix, $M3^t$.

15. A computer system comprising:
   a multimedia input device which generates an audio or video signal;
   a processor coupled to the multimedia input device;
   a memory device coupled to the processor and having stored therein an inverse Discrete Cosine Transform (iDCT) routine for transforming an 8×8 matrix of MPEG data acquired through a zig-zag scan using a packed SIMD instruction, said 8×8 matrix comprising an upper-left quadrant, M1, an upper-right quadrant, M2, a lower-left quadrant, M3, and a lower-right quadrant, M4, each said quadrant comprising a 2×2 matrix of packed data, said iDCT routine, when executed by said processor, causes said processor to perform the steps of:

transposing each said 2×2 matrix to produce an upper-left transposed matrix, $M1^t$, an upper-right transposed matrix, $M2^t$, a lower-left transposed matrix, $M3^t$, and a lower-right transposed matrix, $M4^t$;

swapping said upper-right transposed matrix, $M2^t$, with said lower-left transposed matrix, $M3^t$ to produce a transposed 8×8 matrix;

scaling said transposed 8×8 matrix by multiplying each one of said packed data by predetermined scale factors using the packed multiply high (PMULH) SIMD operation to produce an 8×8 matrix of scaled data;

performing a one-dimensional inverse Discrete Cosine Transform on the columns of said 8×8 matrix of scaled data to produce a matrix of scaled, transformed data;

re-transposing said matrix of scaled, transformed data to produce an 8×8 re-transposed matrix;

performing a second one-dimensional inverse Discrete Cosine Transform on the columns of said 8×8 re-transposed matrix to complete said two-dimensional inverse Discrete Cosine Transform.

\* \* \* \* \*